US012541668B2

(12) United States Patent
Volkerink et al.

(10) Patent No.: US 12,541,668 B2
(45) Date of Patent: *Feb. 3, 2026

(54) ADHESIVE TAPE PLATFORM WITH FORM FACTOR FOR IMPROVED SENSING AND EXTERNAL SENSOR PROBE

(71) Applicant: Trackonomy Systems, Inc., San Jose, CA (US)

(72) Inventors: Hendrik J Volkerink, Palo ALto, CA (US); Ajay Khoche, West San Jose, CA (US); Saurabh Sanghai, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,844

(22) Filed: Sep. 16, 2024

(65) Prior Publication Data

US 2025/0117620 A1   Apr. 10, 2025

Related U.S. Application Data

(63) Continuation of application No. 18/237,850, filed on Aug. 24, 2023, now Pat. No. 12,124,904, which is a continuation-in-part of application No. 17/449,845, filed on Oct. 4, 2021, now Pat. No. 11,885,644, and a continuation-in-part of application No. 17/468,645, filed on Sep. 7, 2021, now Pat. No. 11,829,829.

(60) Provisional application No. 63/400,719, filed on Aug. 24, 2022, provisional application No. 63/086,905, filed on Oct. 2, 2020, provisional application No. (Continued)

(51) Int. Cl.
| | |
|---|---|
| *G06K 19/077* | (2006.01) |
| *G06K 7/10* | (2006.01) |
| *G06K 19/02* | (2006.01) |
| *G06K 19/07* | (2006.01) |

(52) U.S. Cl.
CPC ... *G06K 19/07737* (2013.01); *G06K 7/10405* (2013.01); *G06K 19/025* (2013.01); *G06K 19/0717* (2013.01); *G06K 19/0723* (2013.01); *G06K 19/07735* (2013.01)

(58) Field of Classification Search
CPC ............. G06K 7/10405; G06K 19/025; G06K 19/0717; G06K 19/0723; G06K 19/07735; G06K 19/07737; G06K 19/07739; G06K 19/07758; G06K 19/0776
USPC ...... 235/492; 340/572.1, 572.8, 584, 539.26, 340/539.27
See application file for complete search history.

(56) References Cited

U.S. PATENT DOCUMENTS

| | | | | |
|---|---|---|---|---|
| 12,124,904 B2 * | 10/2024 | Volkerink | ............ | G06K 19/025 |
| 2010/0170352 A1 * | 7/2010 | Petersen | ................ | G01D 9/007 |
| | | | | 235/492 |

* cited by examiner

*Primary Examiner* — Suezu Ellis

(57) ABSTRACT

A wireless sensor device includes a flexible substrate, a cover layer on the flexible substrate, a device layer between the flexible substrate and the cover layer, and a printed circuit board connecting components of the device layer including an electrostatic discharge protected port for connecting an external sensor probe to the wireless sensor device. The device layer includes a processor, a memory, a battery, a first wireless communication system, and one or more onboard sensors; and a printed circuit board connecting components of the device layer comprising an electrostatic discharge protected port for connecting an external sensor probe to the wireless sensor device. The external probe allows for the wireless sensor device to perform sensor readings in environments that are too extreme or hostile to the wireless sensor device, while the wireless sensor device is safely isolated from the extreme or hostile environment.

17 Claims, 23 Drawing Sheets

Related U.S. Application Data

63/081,887, filed on Sep. 22, 2020, provisional application No. 63/075,135, filed on Sep. 5, 2020.

ADHESIVE TAPE PLATFORM WITH FORM FACTOR FOR IMPROVED SENSING AND EXTERNAL SENSOR PROBE

RELATED APPLICATIONS

This application is a continuation of pending U.S. patent application Ser. No. 18/237,850, filed Aug. 24, 2023, which claims priority to U.S. Provisional Patent Application No. 63/400,719, filed Aug. 24, 2022. U.S. patent application Ser. No. 18/237,850 is a continuation-in-part of U.S. patent application Ser. No. 17/449,845, filed Oct. 4, 2021, now U.S. Pat. No. 11,885,644, which itself claims priority to U.S. Provisional Patent Application No. 63/086,905, filed Oct. 2, 2020. U.S. patent application Ser. No. 18/237,850 is also a continuation-in-part of U.S. patent application Ser. No. 17/468,645, filed Sep. 7, 2021, now U.S. Pat. No. 11,829,829, which itself claims priority to U.S. Provisional Patent Application No. 63/075,135, filed Sep. 5, 2020, and to U.S. Provisional Patent Application No. 63/081,887, filed Sep. 22, 2020. All of the above-referenced applications are incorporated herein in their entirety.

FIELD OF THE DISCLOSURE

This disclosure generally relates to wireless internet of things (IOT) devices, and particularly to wireless sensor and communication devices.

DETAILED DESCRIPTION

Figure 1A:
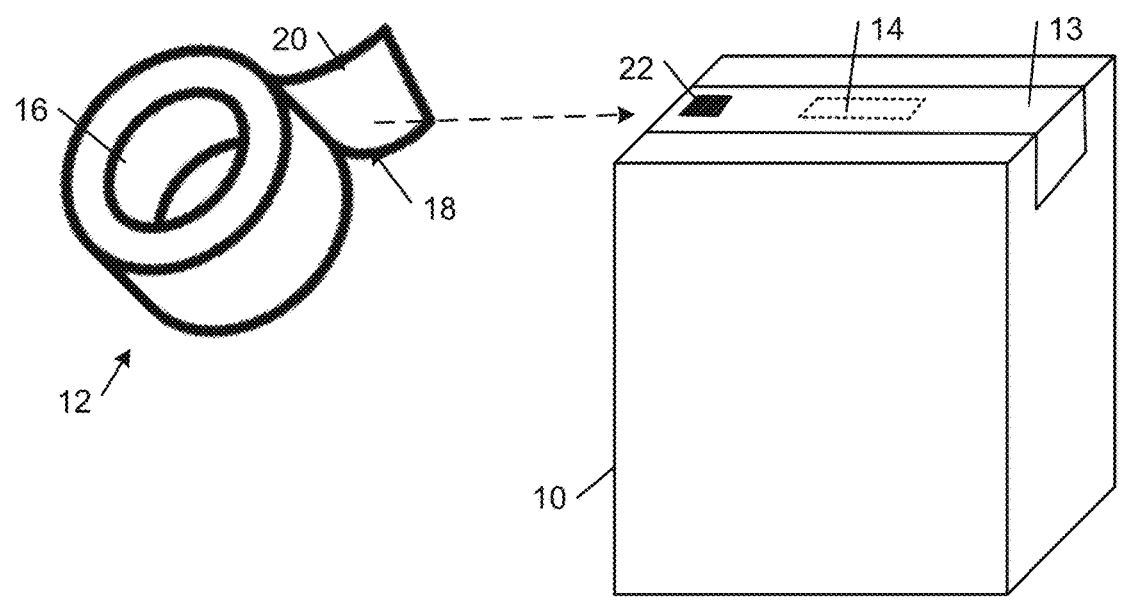
FIG. 1A is a diagrammatic view of an asset that has been sealed for shipment using a segment of an example adhesive tape platform dispensed from a roll, according to some embodiments.

A fully capable adhesive tape platform, also referred to herein as a "sensor-type adhesive tape platform" or a "sensor tape node," is a flexible electronics device configured to perform wireless communications and take sensor measurements. The fully capable adhesive tape platform is configured to monitor assets, and conditions relevant to the assets, and report the data back to a tracking system using wireless communications. In some embodiments, the fully capable adhesive tape platform comprises one or more sensors, a cellular communications system, a global positioning system communications and location tracking system, and a Bluetooth communications system, a battery, a processor, a circuit, and a memory or storage device. In some embodiments, the fully capable adhesive tape platform includes different communications systems and/or different components, not described above.

The fully capable adhesive tape platform comprises a flexible substrate and a flexible cover layer, collectively referred to herein as an "enclosure." The enclosure includes one or more openings that each correspond to one or more sensors of the fully capable adhesive tape platform. In some embodiments, the fully capable adhesive tape platform also comprises one or more shrouds, each shroud a physical barrier that isolates one or more sensors from particles, energy, or other interference. In some embodiments, a shroud may include an aperture for selectively passing through energy or particles to a respective sensor, for the respective sensor to detect. A film, filter, or membrane may cover the aperture for selectively allowing passage of energy or particles and blocking other forms of energy or particles.

In some embodiments, an adhesive tape platform includes an external sensor probe. The external sensor probe is connected to the adhesive tape platform by a pigtail. The pigtail is a cable that connects the adhesive tape platform to the external sensor probe. The length of the pigtail allows the adhesive tape platform to be positioned outside of an isolated or hostile environment, while the external sensor probe is placed inside of the isolated or hostile environment. This arrangement protects the adhesive tape platform and components of the adhesive tape platform from the isolated or hostile environment.

The adhesive tape platforms disclosed herein (including the fully capable adhesive tape platform) includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or "peripheral" wireless node, also referred to as an outer node, leaf node, or terminal node, refers to a node that does not have any child nodes.

In some instances, a "wireless node" may refer to a node or wireless device of the wireless tracking system that is not an adhesive tape platform. For example, a wireless node, in some embodiments, may have a form factor that is not flexible or may not include an adhesive.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

INTRODUCTION

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
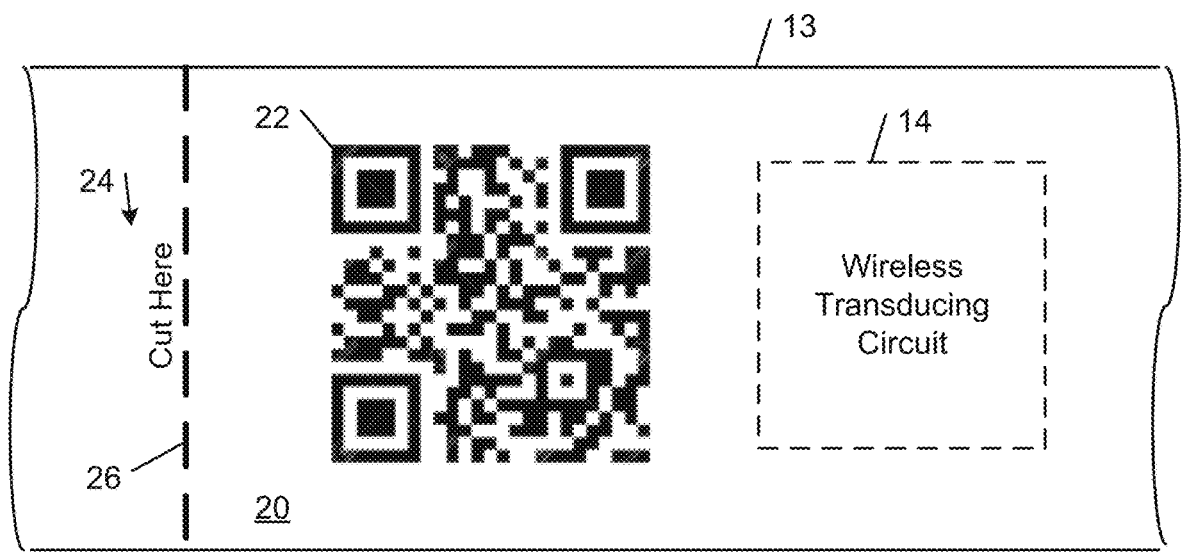
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
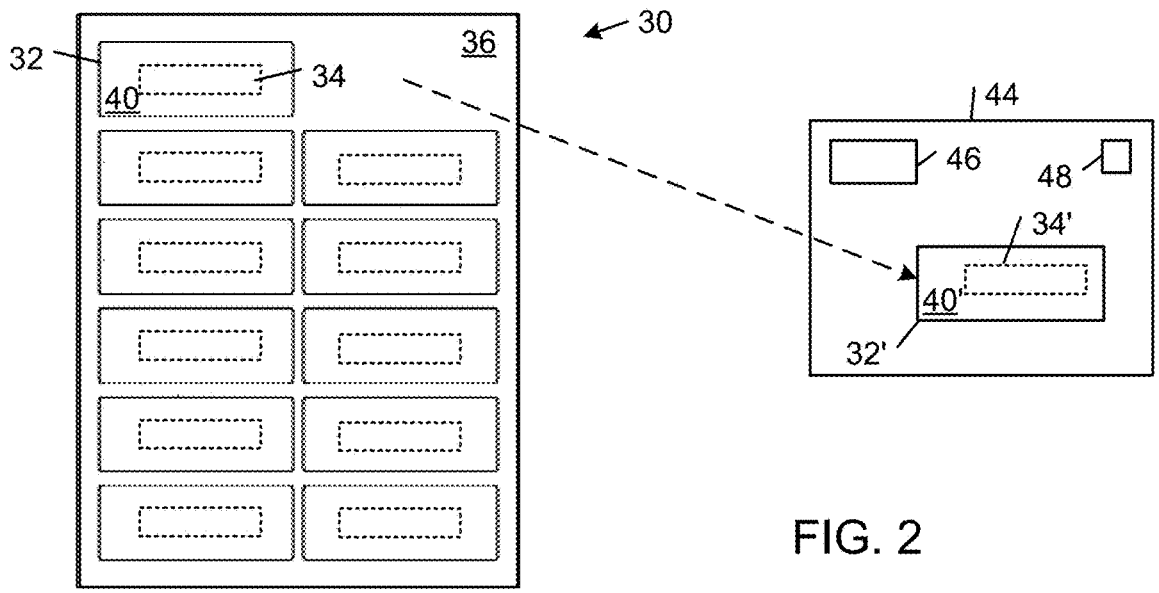
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
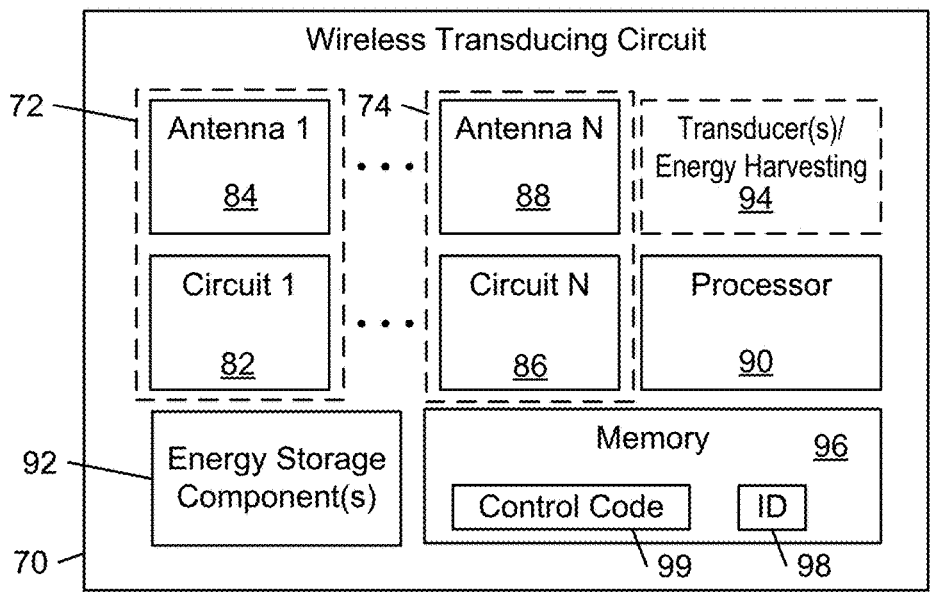
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
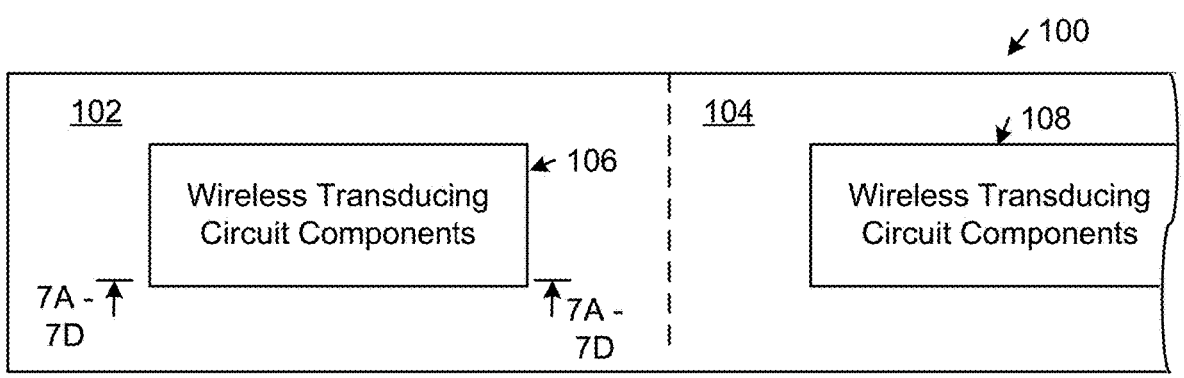
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
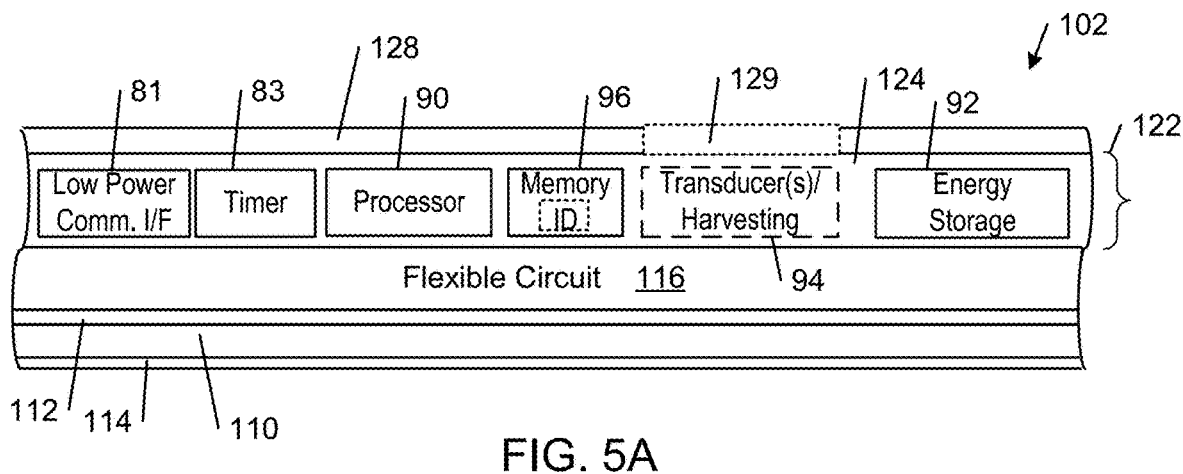
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
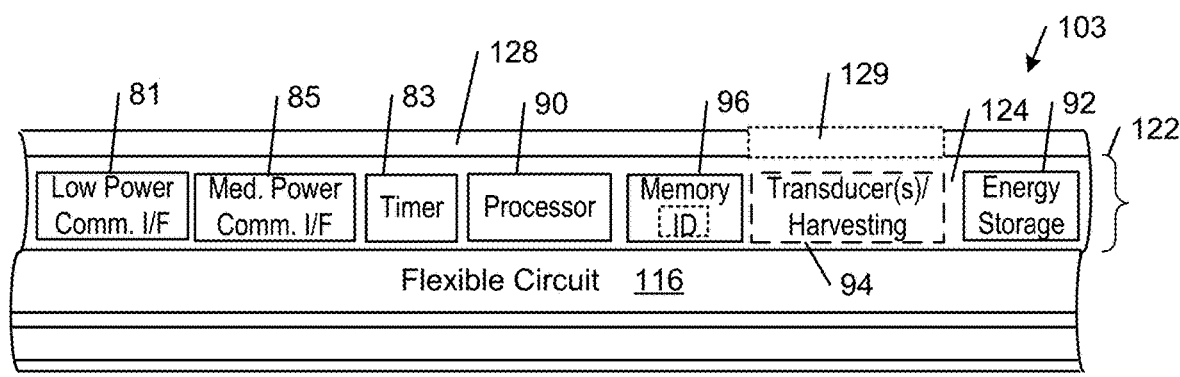

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
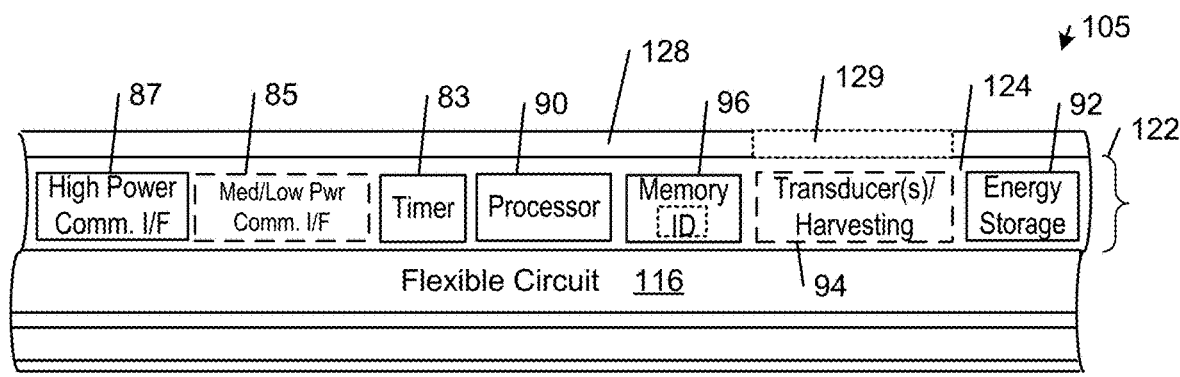

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
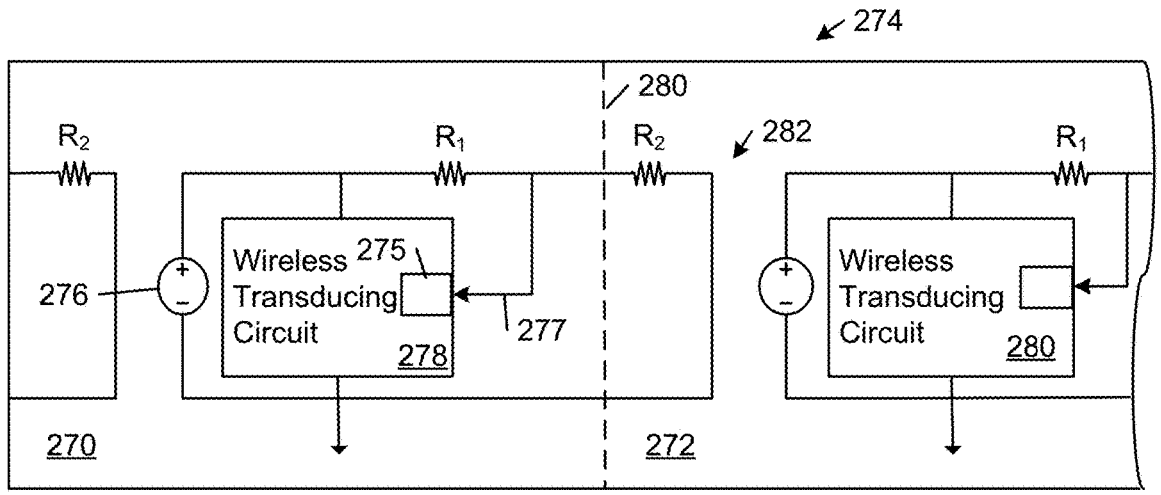
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
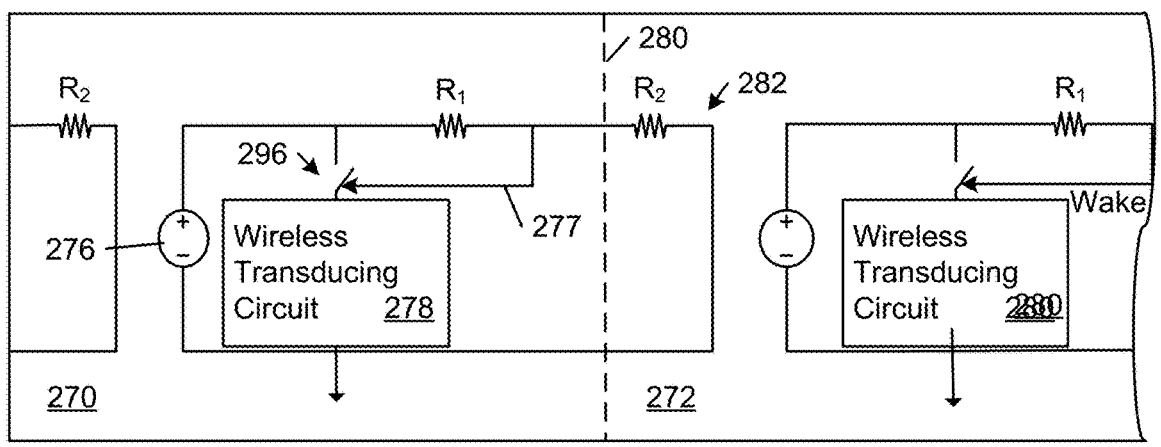

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
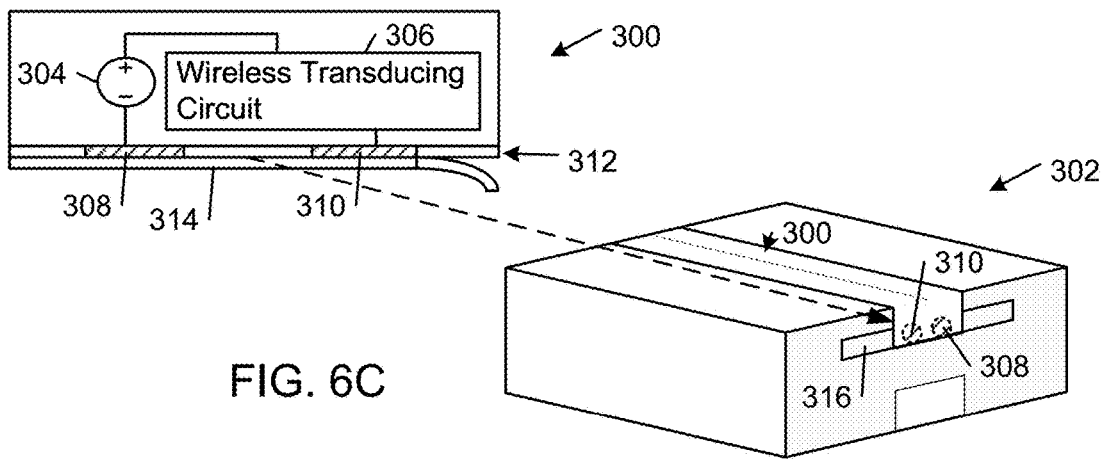
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
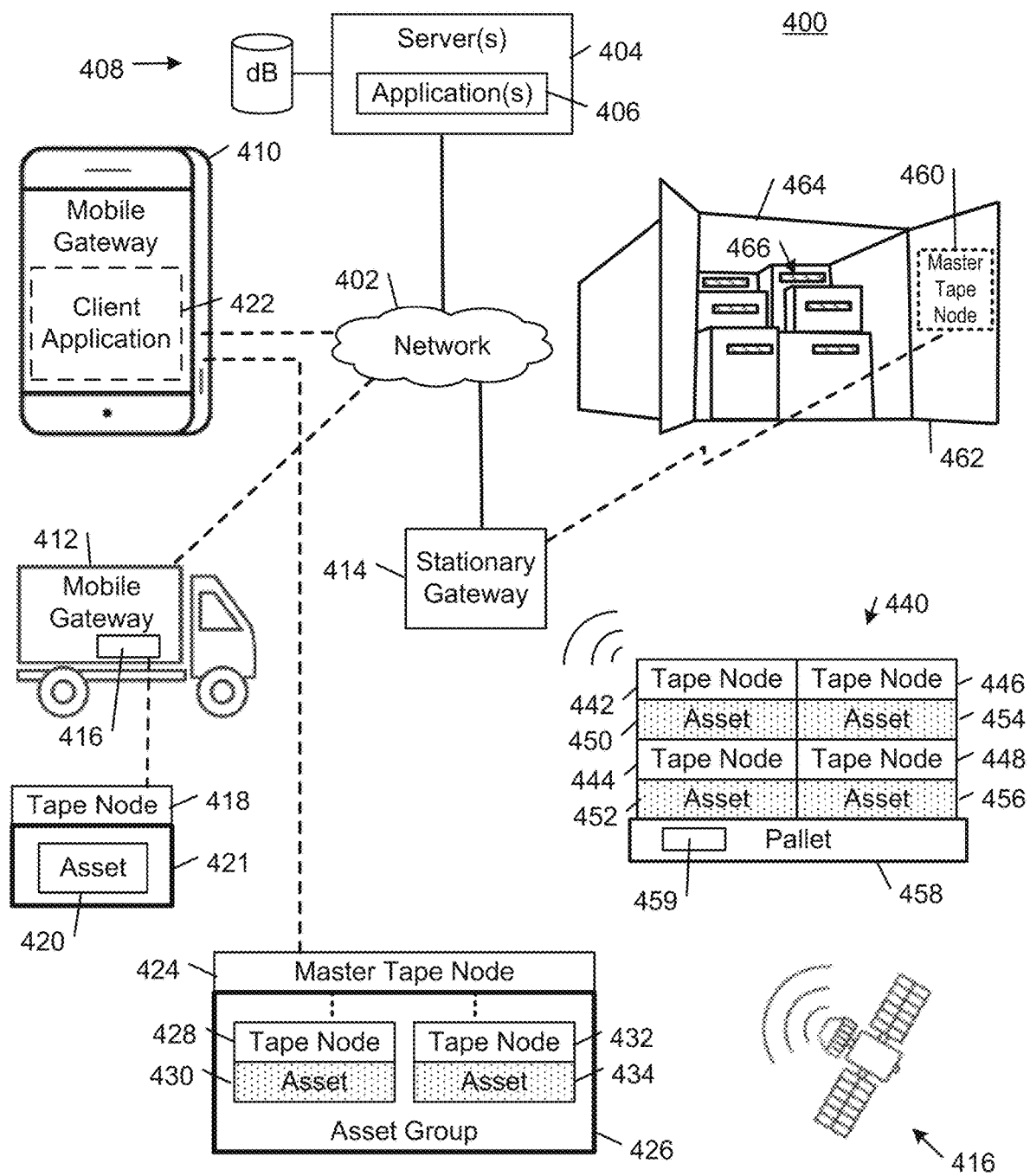
FIG. 7 is a diagrammatic view of an example of a network environment supporting communications with segments of an adhesive tape platform, according to some embodiments.

FIG. 7 shows an example network communications environment 400 (also referred to herein as an "IoT system" 400 or "tracking system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IoT system 400 may be referred to as a node of the IoT system 400, including the tape nodes, other wireless IoT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
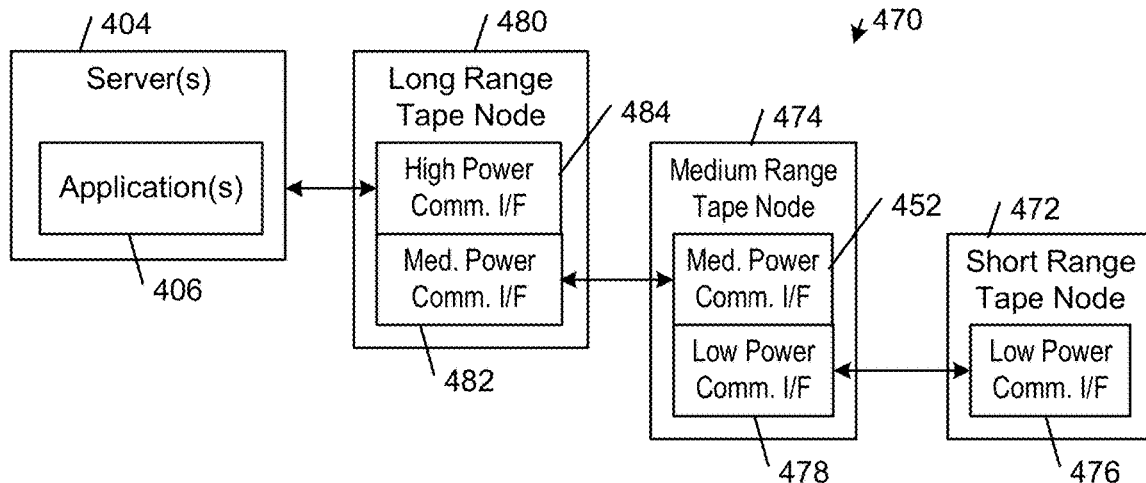
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
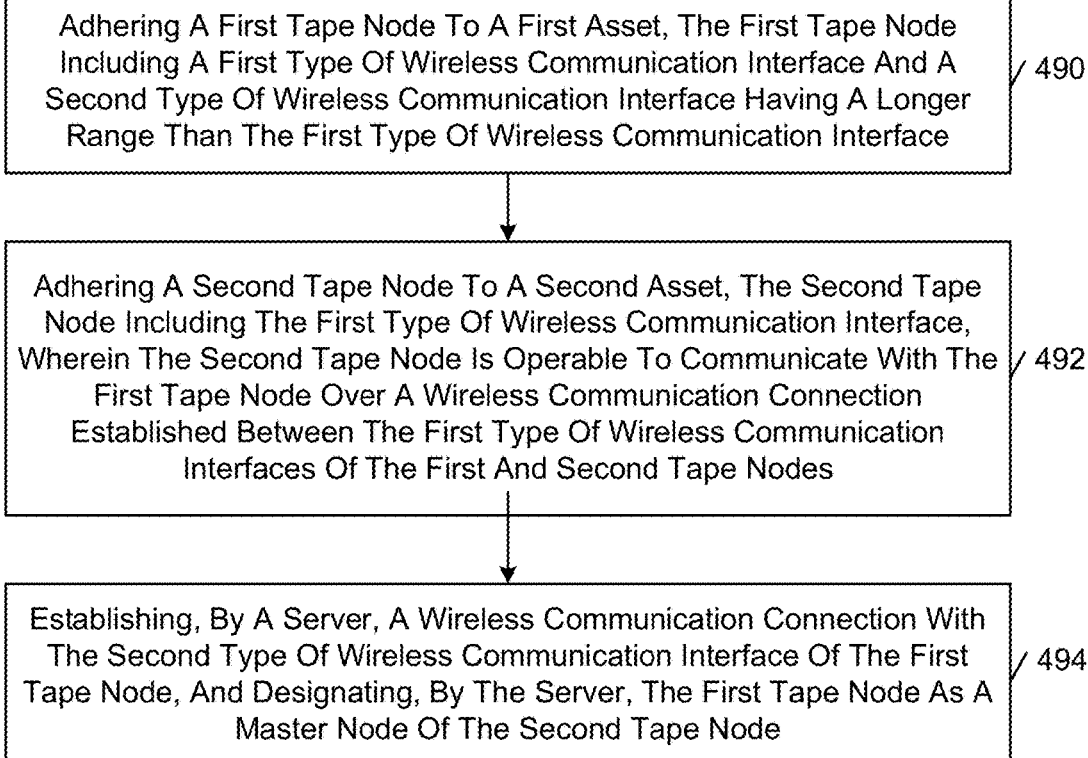
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
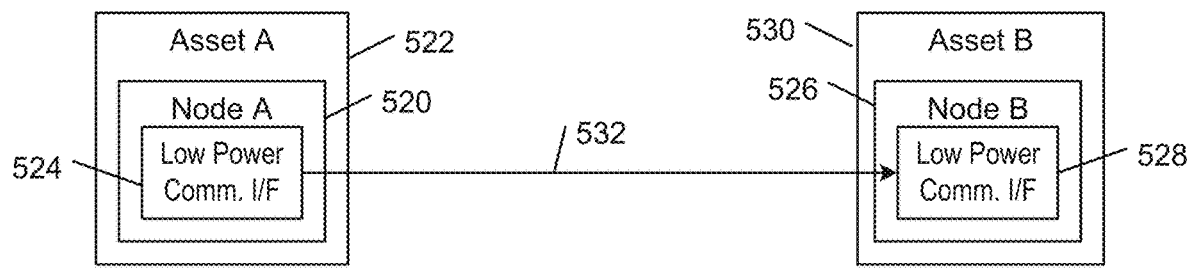
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
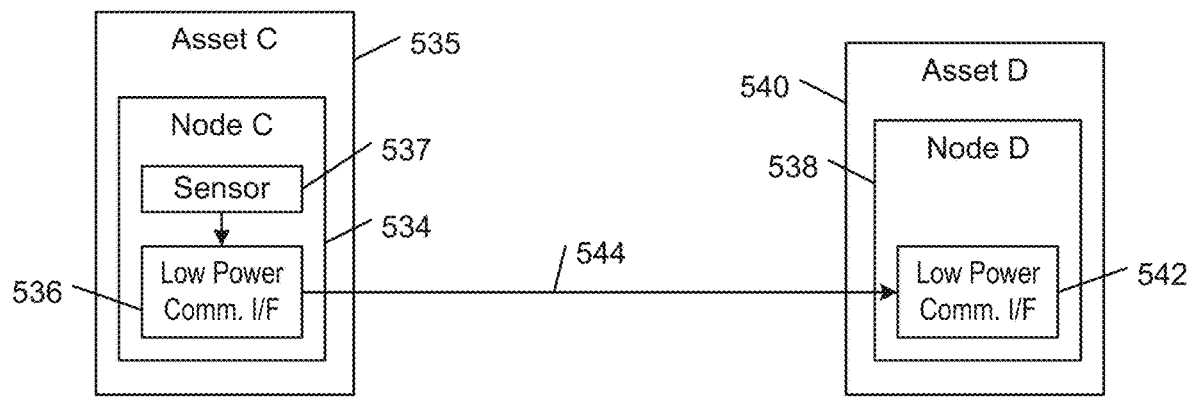

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
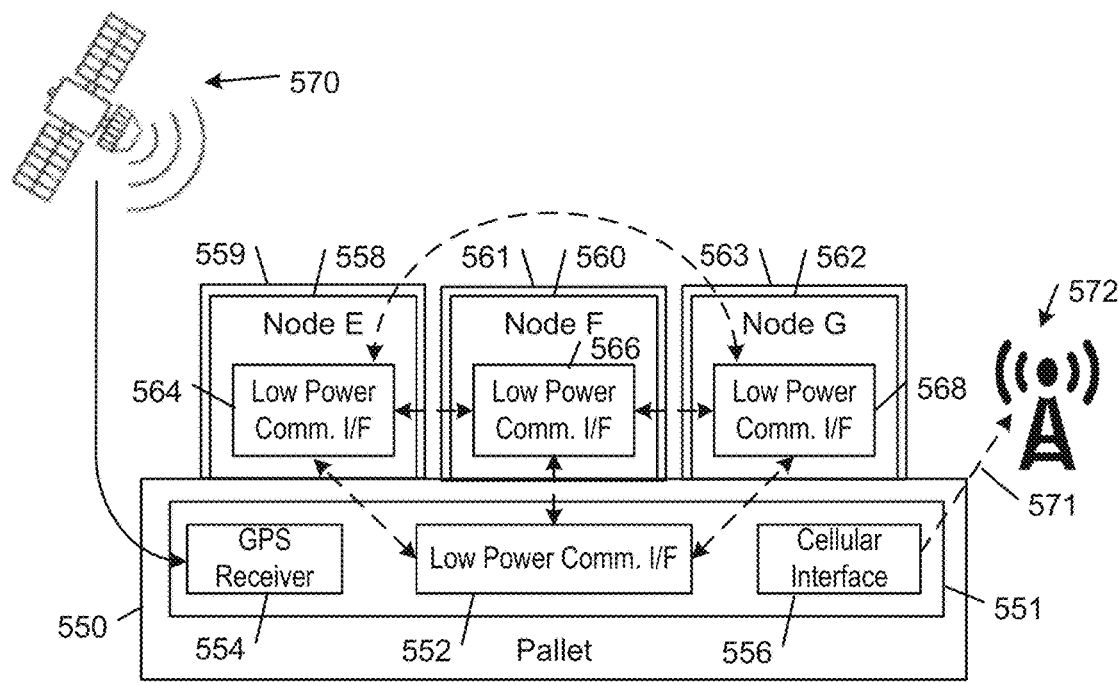

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
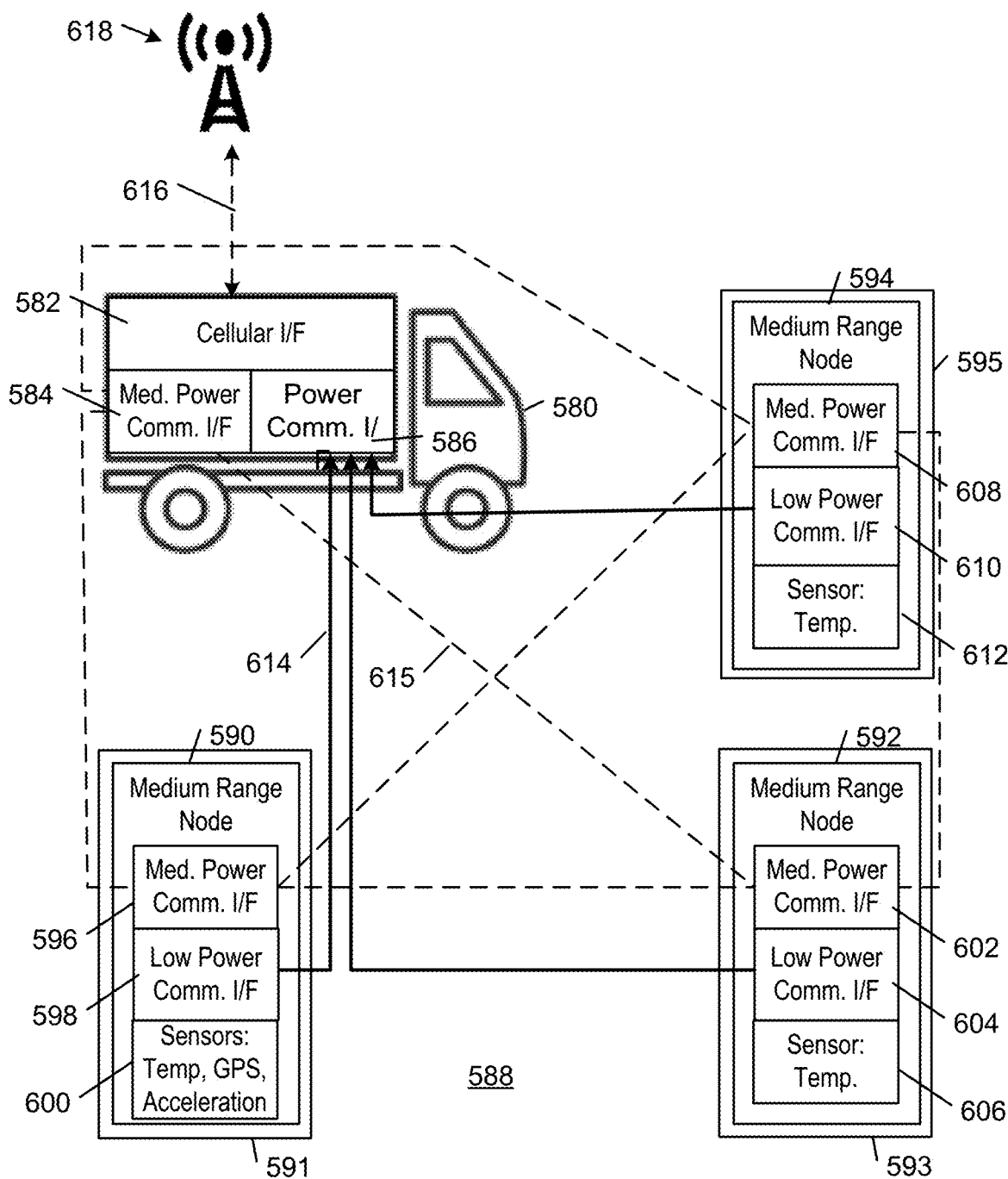

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
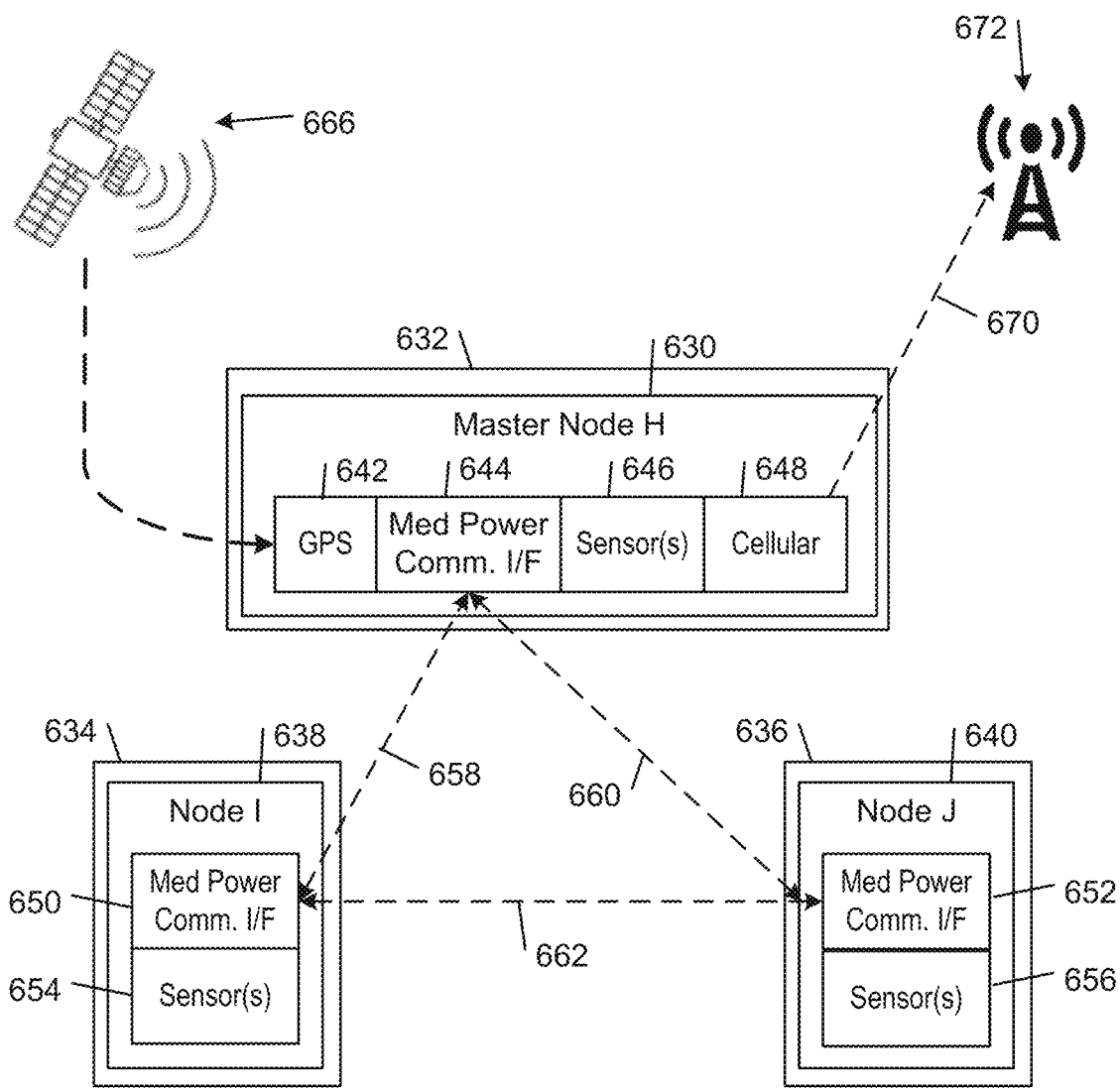

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Adhesive Tape Platform with Detachable External Sensor Probe

Figure 11A:
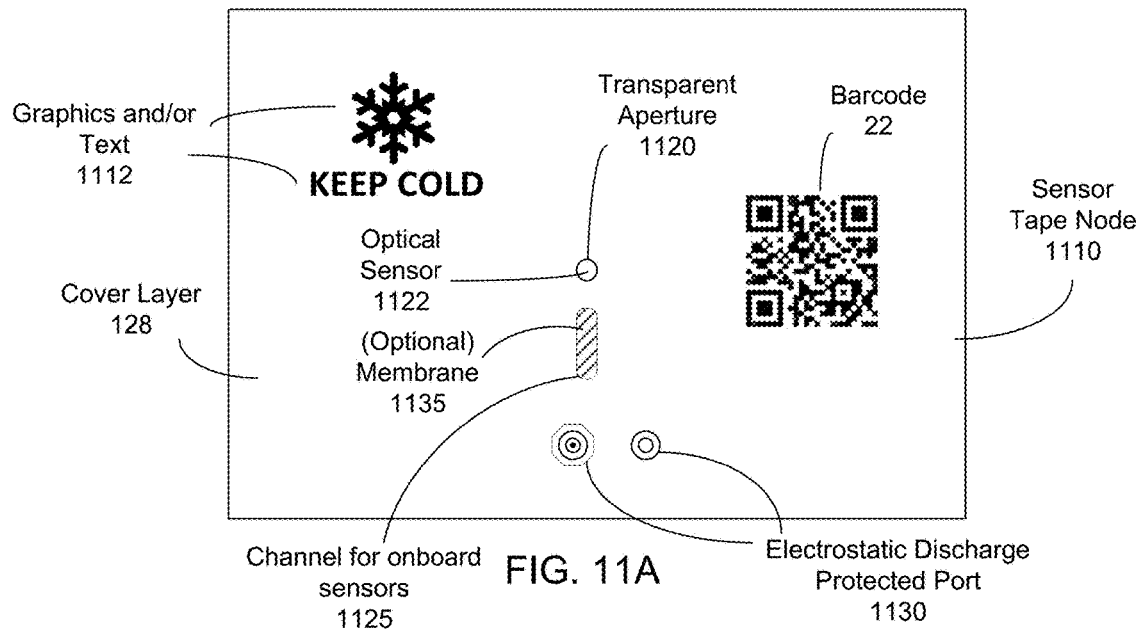
FIGS. 11A-11C are schematic diagrams of a sensor-type of adhesive tape platform with external sensor probe used to monitor conditions in an isolated environment, according to some embodiments.
Figure 11B:
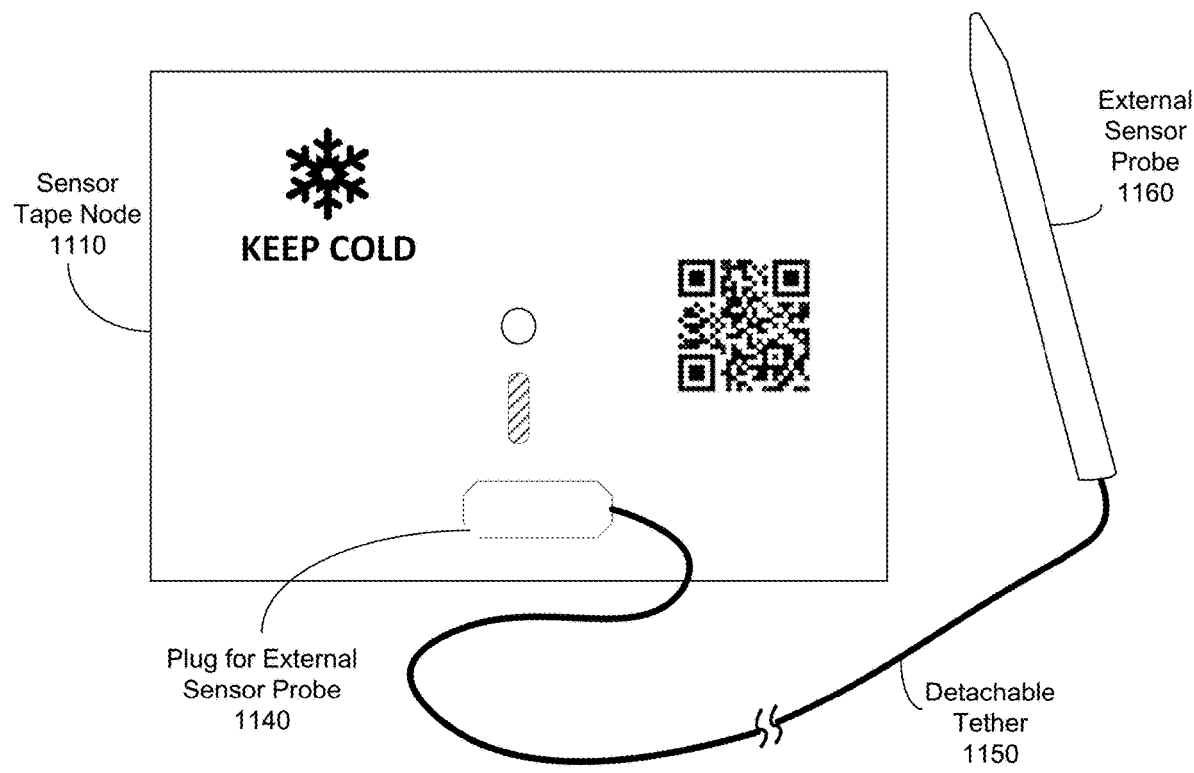
Figure 11C:
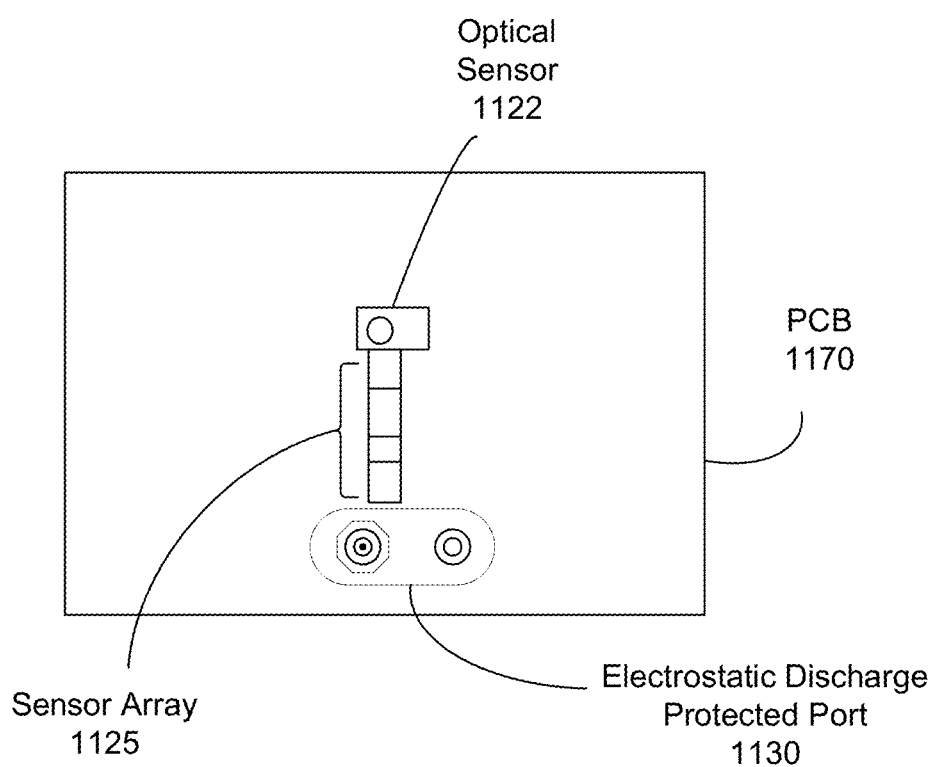

FIGS. 11A-11C are schematic diagrams of a sensor-type of adhesive tape platform 1110, also referred to herein as sensor tape node 1110, with external sensor probe used to monitor conditions in an isolated environment, according to some embodiments. The sensor-type of adhesive tape platform 1110 is an embodiment of the adhesive tape platform 12, 100 shown in FIGS. 1A-6C that includes one or more electrostatic discharge (ESD) protected ports 1130 for connecting an external sensor probe 1160 to the sensor tape node 1110. The external sensor probe 1160 is configured to be detachable and is attached to the sensor tape node 1110 via a tether 1150 that electrically connects one or more sensors in the external sensor probe 1160 to a circuit, e.g. PCB 1170, of the sensor tape node 1110.

FIG. 11A shows a top-down view of the sensor tape node 1110 without the external sensor probe 1160 attached. The ESD protected ports 1130 on the PCB 1170 are exposed by apertures in the cover layer 128, such that a plug 1140 of the external sensor probe 1160 may be plugged into the ports 1130. Additional apertures in the cover layer 128 may expose onboard sensors which are directly integrated with the sensor tape node 1110. In the example of FIG. 11A-11C, a transparent aperture 1120 exposes an optical sensor 1122 to light and a channel 1125 exposes an array of sensors 1125 on the PCB 1170 to the environment or other physical stimulus. The channel 1125 is an elongated aperture in the cover layer 128 that exposes multiple onboard sensors to the environment or other stimulus. The transparent aperture 1120 may be a simple hole or opening in the cover layer that allows light to pass through to the optical sensor 1122, in some embodiments. In other embodiments, the transparent aperture includes a transparent or semi-transparent membrane that covers an opening of the aperture. Alternatively, the transparent aperture may include a transparent cover or a lens that covers an opening of the aperture, but does not allow other materials to permeate into the interior of the sensor tape node 1110. Similarly, the channel 1125 may include an optional membrane 1135 that covers the channel above or below the cover layer 128. The membrane may be a semipermeable membrane that filters particles, according to some embodiments.

Each of the onboard sensors may be embodiments of the transducers 94 of FIGS. 5A-5C. The onboard sensors may include, for example, a temperature sensor, a pressure sensor, a humidity sensor, an optical sensor, an infrared sensor, other types of light sensors, a capacitive sensor, a motion sensor (e.g., a 6-axis or 9-axis motion sensor), an accelerometer, a gyroscope, a hall effect sensor, a magnetometer, an electric field sensor, a voltage sensor, an electrical current sensor, or some other type of sensor.

In other embodiments, the sensor tape node only includes the ESD protected ports 1130 for the external sensor probe 1160 and does not include any onboard sensors. In some embodiments, the sensor tape node 1110 includes multiple ESD protected ports for connection to a plurality of external sensor probes.

FIG. 11B shows the sensor tape node 1110 with the external sensor probe 1160 connected to the sensor tape node 1110. The external sensor probe 1160 is connected to a tether 1150. The tether 1150 includes a plug 1140 at the opposite end of the tether 1150 from the external sensor probe 1160 which plugs into the ESD protected ports of the sensor tape node 1110. The tether 1150 electrically connects the external sensor probe 1160 to a circuit of the sensor tape node 1110 via the plug 1140 and mechanically anchors the external sensor probe to the sensor tape node 1110. The tether 1150 is flexible, according to some embodiments. The tether 1150 may be, for example, an insulated wire that connects one or more sensors of the external sensor probe 1160 to the PCB 1170. The tether 1150 may be a coaxial cable, according to further embodiments.

In other embodiments, the tether 1150 is an optical fiber cable that guides an optical signal from the external sensor probe 1160 to a component on the PCB 1170. In such embodiments, the plug 1140 may connect to fiber optic connections on the PCB 1170, instead of ESD protected ports.

In some embodiments, the combination of the tether 1150 and the external sensor probe 1160 function as an antenna for radio frequency (RF) communication components of the sensor tape node 1110. The external sensor probe 1160 may serve dual functions as a sensor probe and as an RF antenna for enhancing wireless communication capabilities of the sensor tape node 1110. In some embodiments, the tether 1130 and the external sensor probe 1160 function as a counterpoise for a wireless communication system of the sensor tape node 1110.

The external sensor probe 1160 includes one or more sensors for performing sensor measurements of an environment separated or isolated from the main body of the sensor tape node 1110. In some embodiments, the external sensor probe 1160 is also configured to withstand environmental or physical conditions that are too extreme for the tape node 1110 to experience directly. For example, the external sensor probe 1160 may be rated to withstand temperatures outside of an operational temperature range of the tape node 1110. This may be due to a component of the tape node 1110 being limited to specific operational conditions.

The external sensor probe 1160 may include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, a motion sensor, a gyroscopic sensor, an electromagnetic field sensor, a humidity sensor, some other type of sensor, or some combination thereof.

In the example of FIGS. 11A-11C, the plug 1140 and the ESD protected port 1130 include, respectively, two prongs and a receptacle for the two prongs. In other embodiments, the plug 1140 may include a different number of prongs, with the ESD protected port 1130 including a matching receptacle. For example, the plug 1140 may include 3 prongs for connecting three separate conductors of the tether.

FIG. 11C is an example schematic diagram of the PCB 1170 that shows the placement of the ESD protected ports 1130 and the onboard sensors of the sensor tape node 1110. PCB 1170 is an embodiment of the flexible circuit 116 shown in FIGS. 5A-5C. However, in some embodiments, the PCB 1170 is not a flexible circuit, but a rigid PCB. A rigid PCB may be preferred in scenarios where a device with higher rigidity and structural integrity, with less flexibility is desirable. In such embodiments, the sensor tape node 1110 may have a rigid or semi-rigid form factor.

The position of onboard sensors on the PCB 1170 is shown in FIG. 11C. The onboard sensors include an optical sensor 1122 and an array of sensors 1125. The position of the optical sensor 1122 aligns with the transparent aperture 1120, such that light passes though the transparent aperture 1120 and is incident on the optical sensor 1122. The optical sensor 1122 may include a lens, in some embodiments.

The sensor array 1125 includes a plurality of sensors and is aligned with the channel 1125, such that one or more of the sensors in the sensor array 1125 are exposed to the environment or external stimulus. The PCB 1170 may optionally include a sensor shroud that encloses the sensor array 1125. The sensor shroud is discussed in more detail with respect to FIGS. 14A-14E.

The PCB 1170 includes other components, traces, pads, and other features not shown in FIG. 11C. For example, the PCB 1170 may include all or some of the components of the wireless transducing circuit 70. The PCB 1170 may also include a variety of resistors, capacitors, inductors, and other components.

The sensor tape node includes graphics and/or text 1112 displayed on the cover layer 128 of the sensor tape node 1110. Additional graphics or text may be displayed on an exterior surface of the substrate 110 (not shown), as well. The graphics and/or text 1112 may include the written instructions 24, in some embodiments. In further embodiments, the graphics and/or text 1112 may indicate acceptable environmental conditions for the main body of the sensor tape node 1110 or may include instructions for operating the sensor tape node 1110 and the external sensor probe 1160.

The components and arrangement of components shown in FIGS. 11A-11C are for example, and the sensor tape node 1110 and the PCB 1170 may have other configurations and number of components than what is shown in FIGS. 11A-11C, according to some embodiments.

Figure 12:
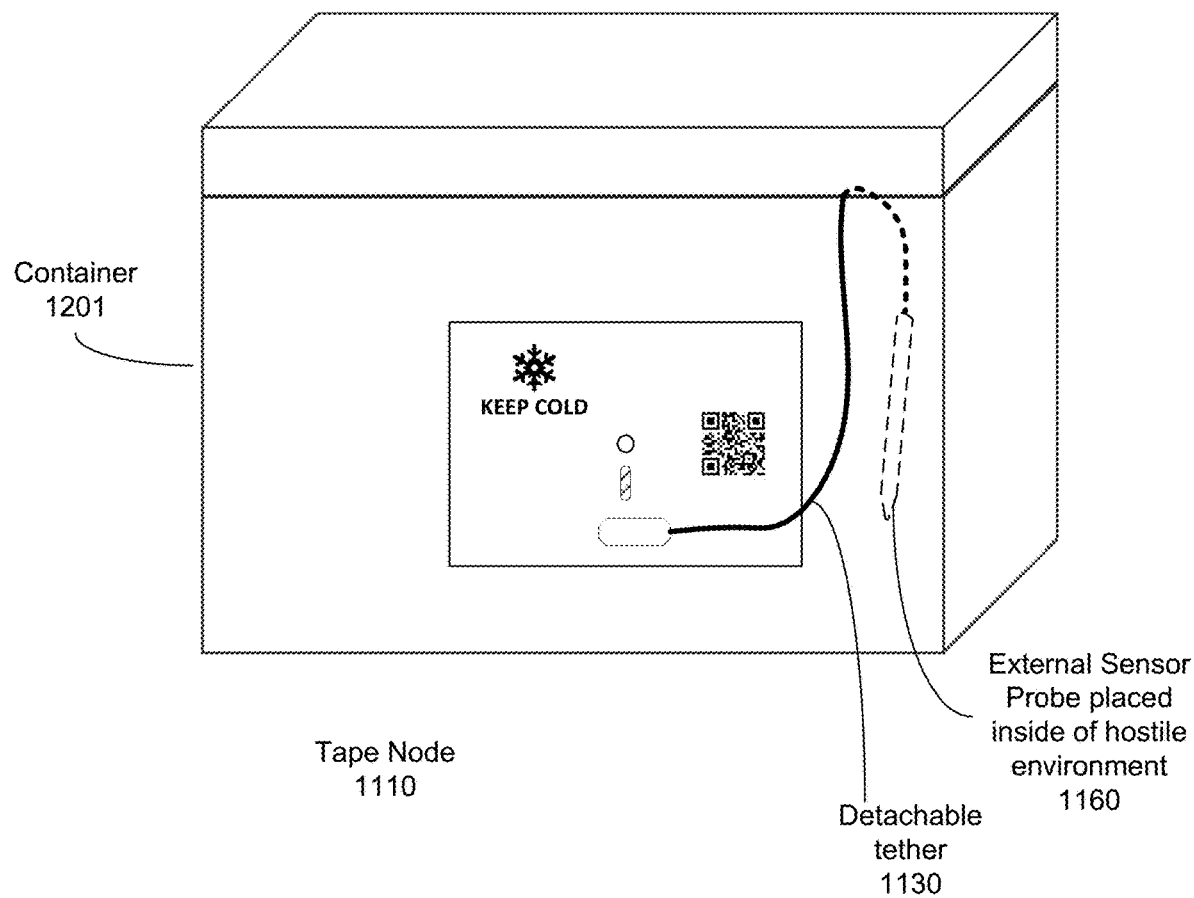
FIG. 12 is a diagram showing an example sensor-type adhesive tape platform with external sensor probe being used to monitor an isolated environment in a container by placing the external sensor probe inside the container, according to some embodiment.

FIG. 12 is a diagram showing an example sensor-type adhesive tape platform with external sensor probe being used to monitor an isolated environment in a container by placing the external sensor probe inside the container, according to some embodiment. In the example of FIG. 12, the interior of the container 1201 contains an asset being held at an extremely low temperature. The environmental conditions of the interior of the container 1201 is outside of the operational tolerances of the tape node 1110. For example, one or more components of the tape node may not function correctly outside of a temperature range that does not include the temperature experienced inside the container 1201. The body of the tape node 1110 is isolated from the hostile environment inside of the container by being placed outside of the container, while still monitoring conditions of the interior of the container by having the external sensor probe 1160 installed inside of the container. Data signals from the external sensor probe 1160 are carried to the processor of the sensor tape node 1110 via the detachable tether 1130 which extends from the sensor probe 1160 inside of the container, out through an opening in the container 1201, and to the tape node 1110. The external sensor probe 1160 and the tether 1130 may be rated for different conditions than the tape node 1110, which allow it to be placed in environments with more extreme conditions separate or isolated from an environment of the sensor tape node 1110. This allows the sensor tape node 1110 to monitor an asset or container, without exposing the sensor tape node 1110 to extreme conditions that may render it inoperable or may damage a component of the sensor tape node 1110.

In the example of FIG. 12 the extreme conditions are extremely low temperatures inside of the container 1201. Further, the external sensor probe 1160 includes a temperature sensor that is rated for a wider range of temperatures than that of the sensor tape node 1110 itself and the onboard sensors. In other embodiments, the extreme environmental conditions that the external sensor probe 1160 is exposed to may include high pressure, low pressure, high humidity, moisture, immersion in liquid, high magnetic fields, high electrical fields, high voltage, frequent exposure to high force or acceleration, or some other environmental conditions. The extreme environmental conditions may correspond to conditions outside of threshold conditions (e.g., a temperature range or a pressure range) necessary for the main body of the tape node 1110 to function as intended, according to some embodiments.

The external sensor probe also allows for the sensor tape node 1110 to measure two different environments at the same time. For example, the sensor tape node 1110 may use an onboard sensor to measure the conditions outside of the container 1201, while the external sensor probe 1160 measures the conditions inside of the container 1201. Further, a differential in the environments may be measured using this configuration. A temperature sensor of the onboard sensors of tape node 1110 may measure the temperature outside of the container 1201 simultaneously with the external sensor probe 1160 measuring the temperature inside of the container 1201. A differential in the two temperatures may be calculated based on the sensor readings and monitored by the tracking system. In some embodiments, the sensor tape node 1110 takes action in response to detecting an event that corresponds to a differential sensor reading between an onboard sensor and the external sensor probe being below a threshold or above a threshold.

In specific embodiments, the external sensor probe 1160 and tether 1130 are rated to withstand temperatures from −250 C to 1000 C. In further embodiments, the external sensor probe 1160 is configured to take temperature measurements using a temperature sensor in the same range of −250 C to 1000 C. In some specific embodiments, the body of the sensor tape node 1110 is configured to withstand temperatures of −40 C to 85 C.

Adhesive Tape Platform with Specialized Enclosure for Sensors

Figure 13:
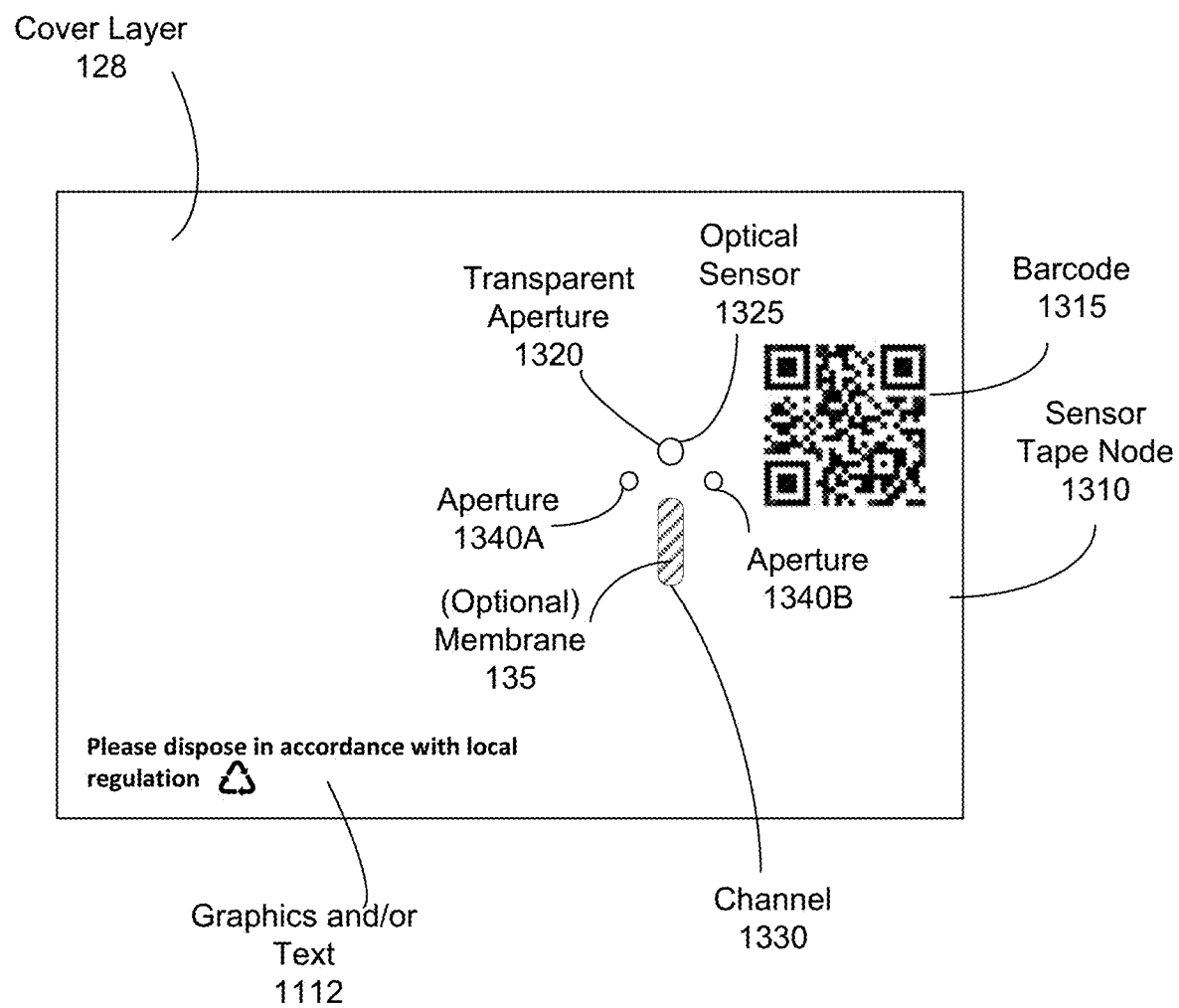
FIG. 13 shows an example sensor-type of adhesive tape platform, according to some embodiments.

FIG. 13 shows an example sensor-type of adhesive tape platform 1310, also referred to herein as sensor tape node 1310, according to some embodiments. The sensor tape node 1310 is an alternate embodiment of the sensor tape node 1110 that does not include the ESD protected port or any port for an external sensor probe. The sensor tape node 1310 in FIG. 13 is shown having an example arrangement of apertures 1340 (including apertures 1340A, 1340B) in the cover layer 128, a transparent window 1320, and a channel 1330 for exposing onboard sensors of the sensor tape node 1310 on an embodiment of the PCB 1170 to the environment and physical stimulus. The PCB of sensor tape node 1310 includes sensors aligned with the apertures 1340, 1345, and an array of sensors aligned with the channel 1330. An optical sensor is aligned with the transparent window 1320. The transparent window 1320 is an embodiment of the transparent aperture 1120. The channel 1330 is an embodiment of the channel 1125.

FIG. 14A-14E are schematic diagrams of a sensor-type of adhesive tape platform 1410, also referred to herein as "sensor tape node" 1410, with an integrated flow channel for enhancing sensing capabilities of on-board sensors, according to some embodiments. The sensor tape node 1410 is an embodiment of the sensor tape node 1310, which also includes the flow channel 1430 and the sensor shroud 1440. Also, the sensor tape node 1410 has a different arrangement of openings (including the aperture 1340C and the flow ports 1412A, 1412B) in the cover layer 128 than the example sensor tape node 1310 shown in FIG. 13.

Figure 14A:
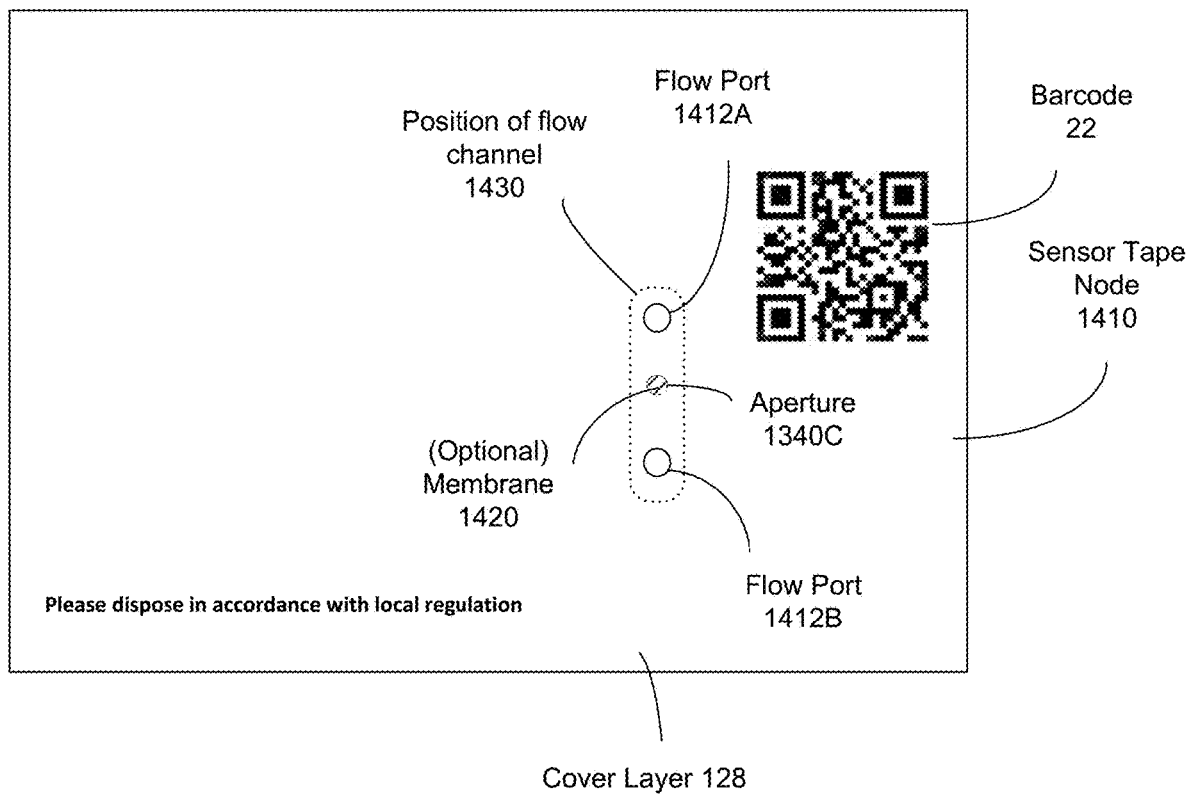
FIGS. 14A-14E are schematic diagrams of a sensor-type of adhesive tape platform with an integrated flow channel for enhancing sensing capabilities of on-board sensors, according to some embodiments.

FIG. 14A shows a top-down view of the sensor tape node 1410. The example of FIG. 14A includes an arrangement of flow port 1412A and flow port 1412B (collectively referred to herein as flow ports 1412) that allow air and other particles to flow through a flow channel 1430. The flow channel 1430 is a cavity on the interior of the sensor tape node 1410 through which air and other particles can pass through and reach onboard sensors of the sensor tape node 1410. The flow channel 1430 may be formed by creating a gap between the substrate 110 and the cover layer 128, according to some embodiments. The substrate 110 and the cover layer 128 enclose the flow channel 1430, allowing air and other particles to flow into the channel 1430, but not into other portions of the interior of the sensor tape node 1410. This effectively allows only a portion of the sensor tape node 1410 including the onboard sensors to receive air and other particles without exposing other portions on the interior of the sensor tape node to damage or other risks associated with the air or other particles. Further, a sensor shroud 1440 may be placed on the PCB 1470 that protects and/or isolates each onboard sensor from each other. The sensor shroud 1440 may selectively expose specific onboard sensors to air or other particles, while protecting other onboard sensors from air or other particles that may damage the sensors or interfere with their measurements. The sensor shroud is discussed in additional detail below with respect to FIGS. 14C-14E.

The PCB 1470 is an embodiment of PCB 1170 that includes onboard sensors that are aligned with compartments of the sensor shroud 1440 on the PCB 1470. The PCB 1470 does not include the ESD protected port shown in FIG. 11C.

Figure 14B:
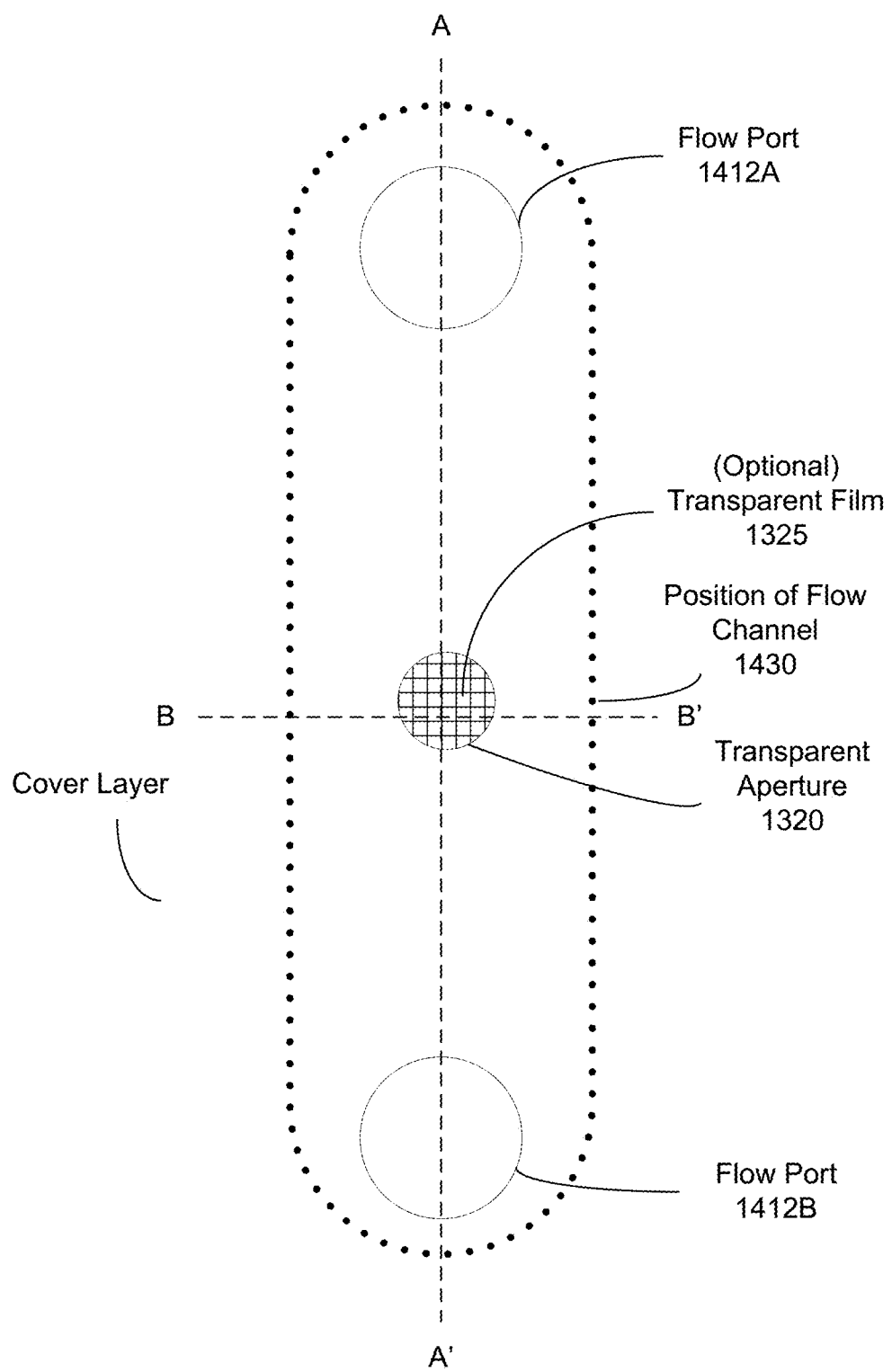

FIG. 14B shows a close-up view of the flow ports 1412 and their position with respect to the flow channel 1430. The flow ports are openings in the cover layer 128 that allow air and/or other particles to enter the flow channel 1430. The flow port 1412A is positioned at one end of the flow channel 1430, and the flow port 1412B is positioned at an opposite end of the flow channel 1430. This arrangement allows for effective inlet and outlet of air and other particles through the flow channel 1430, below the cover layer 128. In some embodiments, the flow ports are covered by a membrane that selectively allows particles to permeate into the flow channel 1430. For example, the membrane may be a filter of a specific particle size.

In the example of FIG. 14B, a transparent aperture 1320 exposes an optical sensor of the onboard sensors to light. The aperture 1320 is covered by an optional transparent film 1325 which allows light to pass through, but blocks particles or other contaminants. In some further embodiments, the transparent film 1325 is a lens. In some embodiments, the transparent film acts as a light filter for allowing only a specific range of light wavelengths to pass through.

Figure 14C:
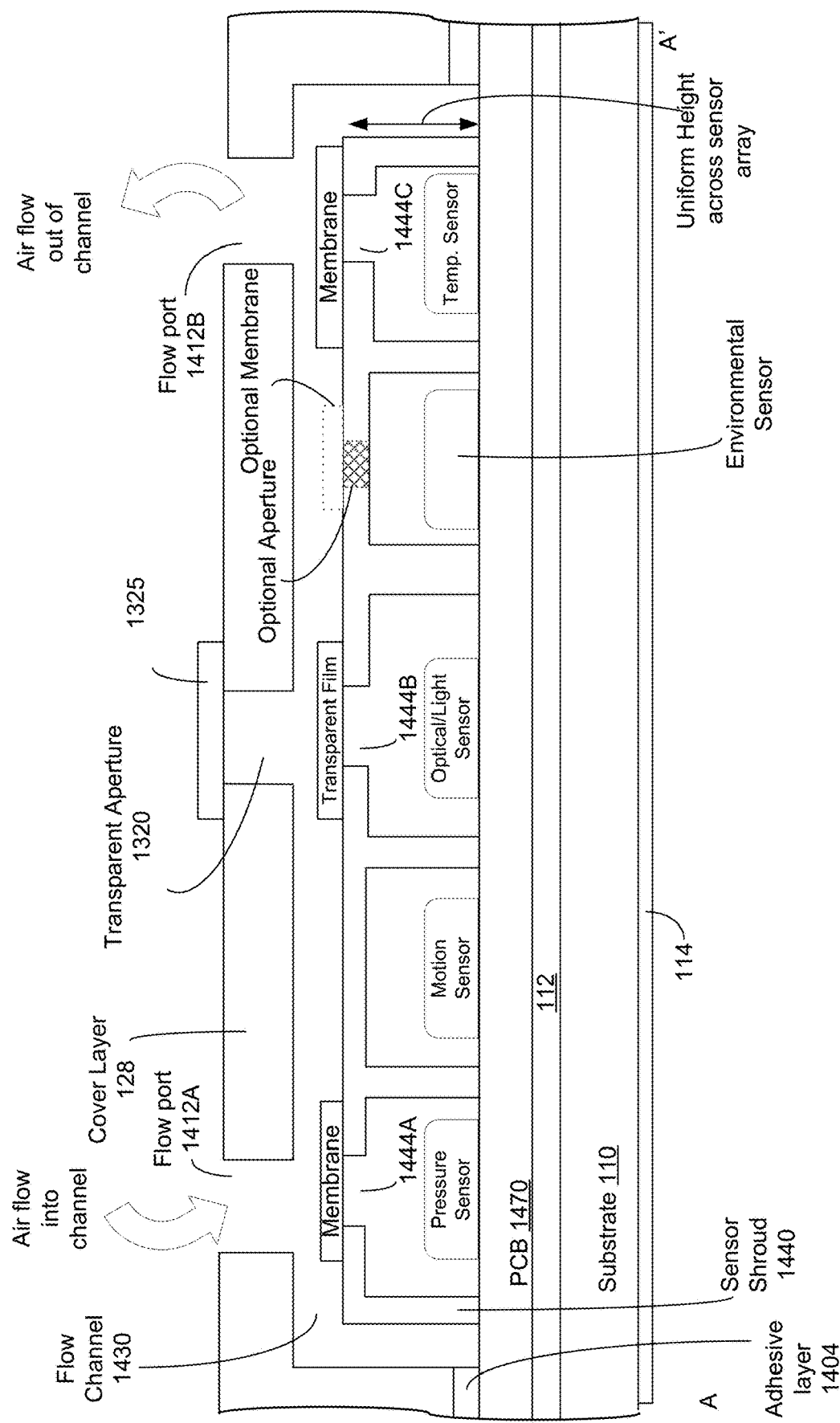

FIG. 14C shows a schematic diagram of a cross-section along line A-A' of the sensor tape node 1410 as shown in FIG. 14B, according to some embodiments. The flow channel 1430 is a cavity on the interior of the sensor tape node 1410 that is positioned between the substrate 110 and the cover layer 128. The flow channel 1430 contains a plurality of onboard sensors and a sensor shroud 1440 enclosing the plurality of onboard sensors. The sensor shroud 1440 includes a compartment for each sensor of the plurality of onboard sensors that isolates each sensor from the others, according to some embodiments. In other embodiments, the sensor shroud includes one continuous compartment that includes multiple onboard sensors in the compartment. The sensor shroud 1440 is affixed or adhered to the PCB 1470, such that the sensor shroud 1440 and the PCB 1470 fully enclose each of the plurality of onboard sensors. The sensor shroud 1440 and the PCB 1470 isolate the onboard sensors in the compartments from the air, other particles, and physical stimulus (e.g., light, sound, or other physical stimulus) in the flow channel 1430, except for compartments that include a shroud aperture 1444. The example of FIG. 14C includes shroud opening 1444A which exposes a pressure sensor to the air pressure in the flow channel 1430, shroud opening 144B which allows light to pass from the transparent aperture 1320 to an optical sensor 144B but blocks particles and environmental hazards from reaching the optical sensor aligned with the transparent aperture 1320, and shroud opening 1444C which exposes a temperature sensor to air in the flow channel for making air temperature readings. Although not shown in FIG. 14C, the shroud 1440, the PCB 1470, and the sensor tape node 1410 may include other components, compartments, and other configurations, according to some embodiments.

A shroud aperture 1444 may also include a membrane or film that selectively blocks particles, light, sound, or other physical stimulus from passing through. For example, the membrane may be a semi-permeable membrane that filters particles above a threshold size.

The sensor shroud 1440 allows for onboard sensors to be exposed to the environment outside of the sensor tape node 1410, without compromising the integrity of other components that would be at risk of damage or failure when exposed to the environment. For example, the sensor shroud 1440 and the flow channel 1430 may allow humidity to reach an environmental sensor, which includes a combination of a temperature sensor, a pressure sensor, and a humidity sensor, without allowing the humidity to damage components outside of the flow channel 1430 and components in compartments of the sensor shroud 1440 other than the compartment housing the environmental sensor.

The flow channel is sealed around its perimeter by an adhesive layer 1404 that bonds the substrate to the PCB 1470 cover layer 128 and/or to the substrate 110 in portions of the sensor tape node outside of the flow channel 1430. In other embodiments, optional intermediate layers may be in place between the substrate 110 and the cover layer 128, such as layers or adhesives for water proofing the sensor tape node 1410.

While the flow port 1410A is shown overlapping the shroud aperture 1444B in FIG. 14C, this may not be the case in some embodiments. The same applies for flow port 1412B and shroud aperture 1444C.

Figure 14D:
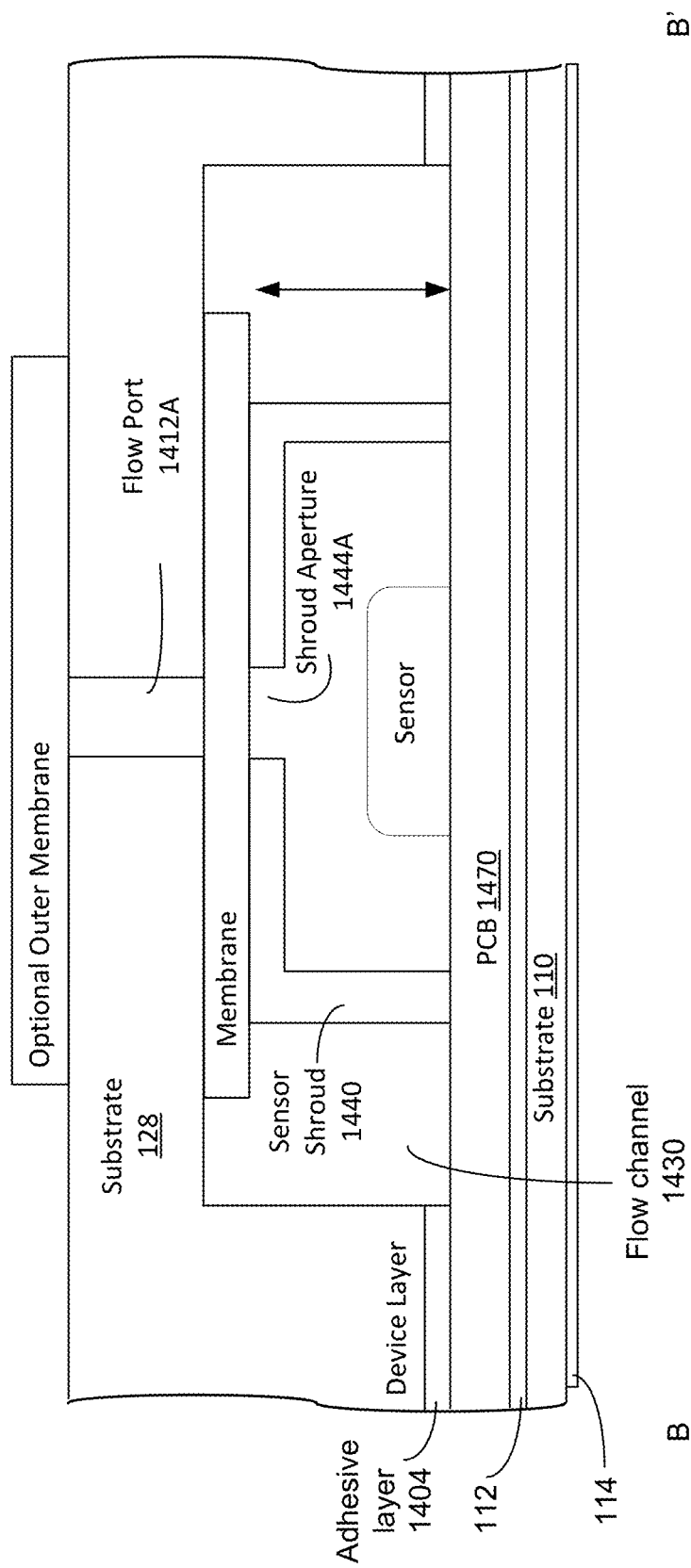

FIG. 14D shows a schematic diagram of a cross-section along line B-B' of the sensor tape node 1410 as shown in FIG. 14B, according to some embodiments.

Figure 14E:
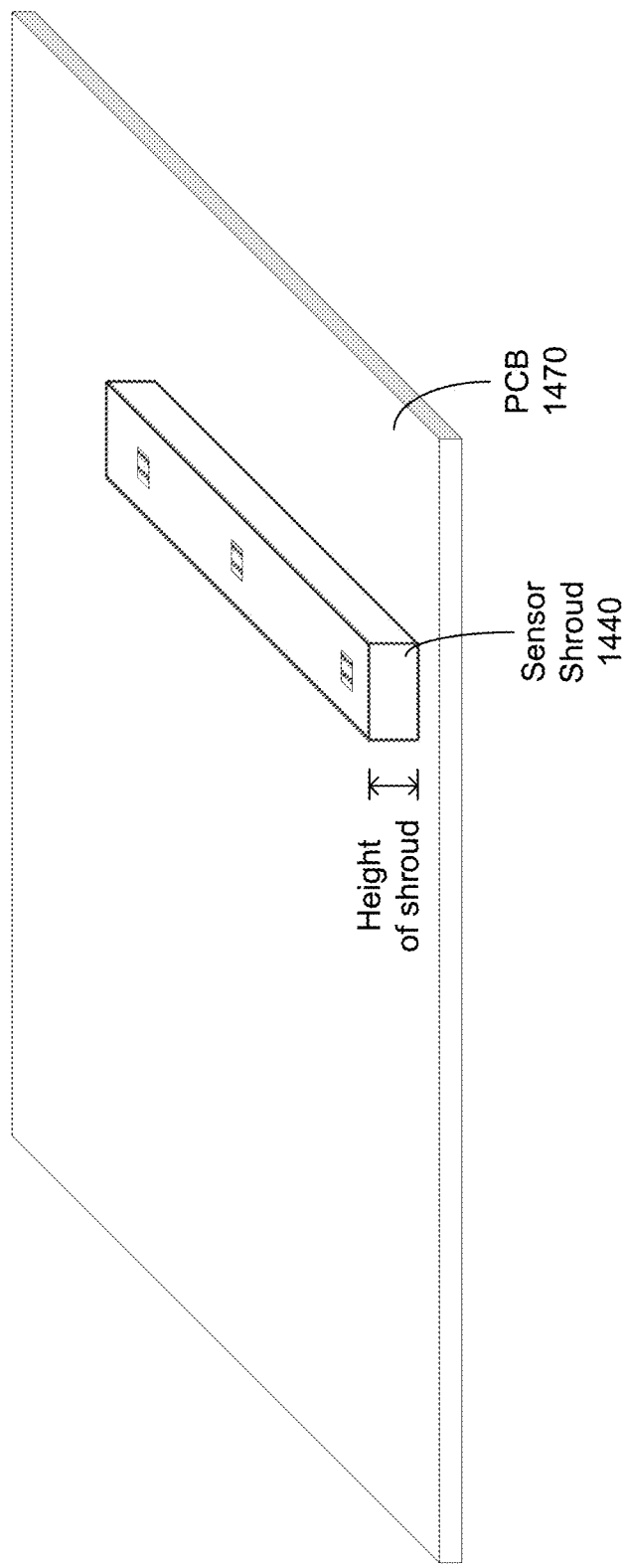

FIG. 14E shows a perspective view of the PCB 1470 of the sensor tape node 1410 including the sensor shroud 1440. FIG. 14E is merely illustrative and does not show all the components included in the PCB 1470 or the device layer 122. The sensor shroud 1440, in addition to providing selective isolation or exposure of the onboard sensors to air, particles, or physical stimulus, offers physical protection from force or physical trauma. The sensor shroud 1440, according to some embodiments, has a uniform height along its length, which allows sensor components of different sizes to be used, while maintaining a uniform physical for physically interfacing with the cover layer 128 and openings in the cover layer 128. In further embodiments, the height of the sensor shroud 1440 corresponds to a height of other components on the PCB 1470, resulting in a relatively uniform height profile among components in the device layer 122 on the PCB 1470 and the sensor shroud 1440. For example, if the processor 90 has a height/thickness of 1 mm, the height of the sensor shroud may also be 1 mm. In further embodiments, the height of the sensor shroud may be within a threshold deviation from the height of other components of the PCB 1470 (e.g., 1 mm±0.1 mm for the above example of the processor).

The uniform height also serves to allow for a flexible embodiment of the sensor tape node 1410 to be flexed with more uniform strain on the PCB 1470 and other components of the sensor tape node 1440. In such embodiments, the PCB 1470 may be a flexible PCB.

FIGS. 15A-15D are schematic diagrams showing placement of sensors on a printed circuit board (PCB) of the sensor-type of adhesive tape platform shown in FIGS. 14A-14D, according to some embodiments. FIGS. 15A-15D are merely illustrative and do not show all components of the PCB 1470 and the device layer 122.

Figure 15A:
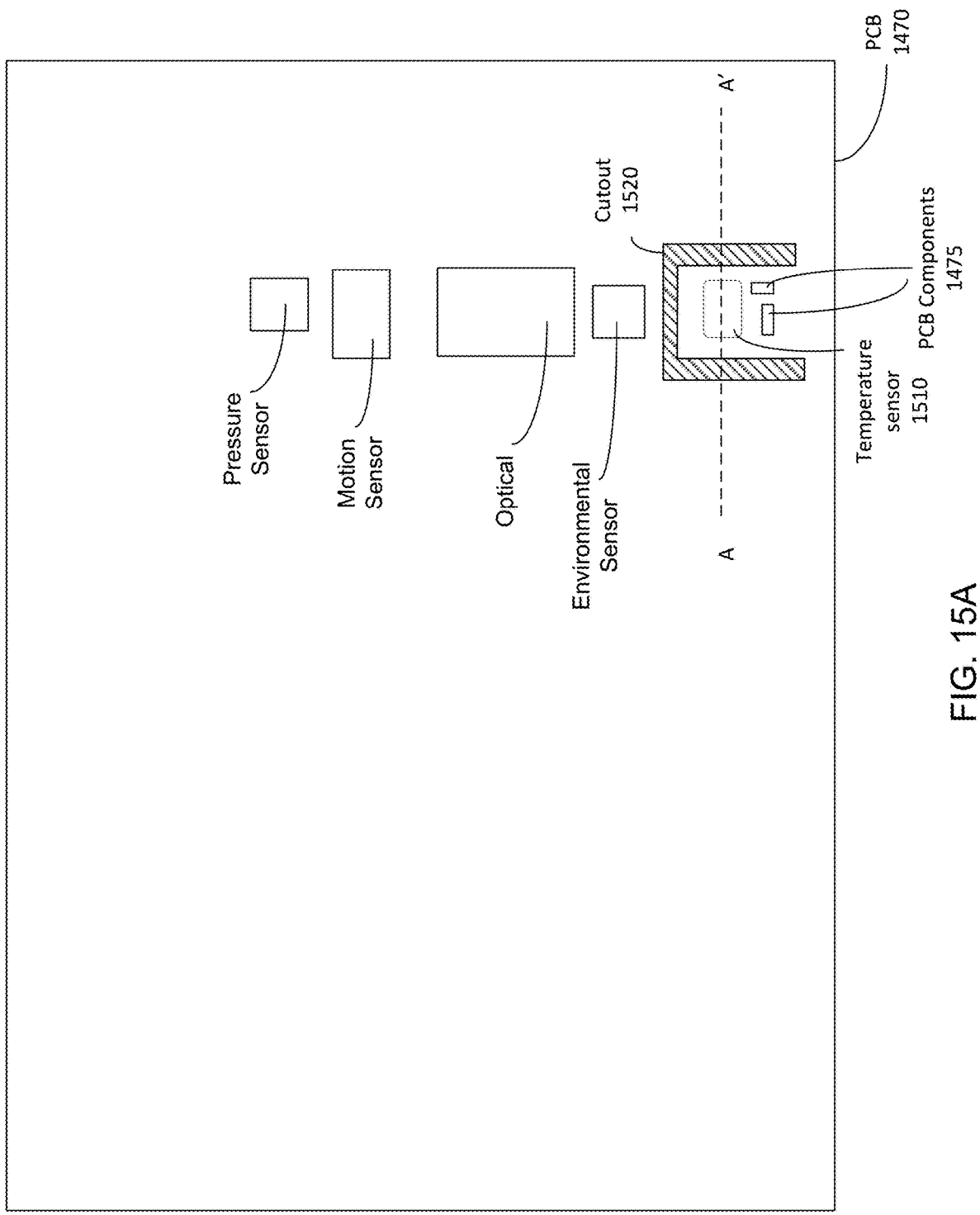
FIGS. 15A-15D are schematic diagrams showing placement of sensors on a printed circuit board (PCB) of the sensor-type of adhesive tape platform shown in FIGS. 14A-14D, according to some embodiments.
Figure 15B:
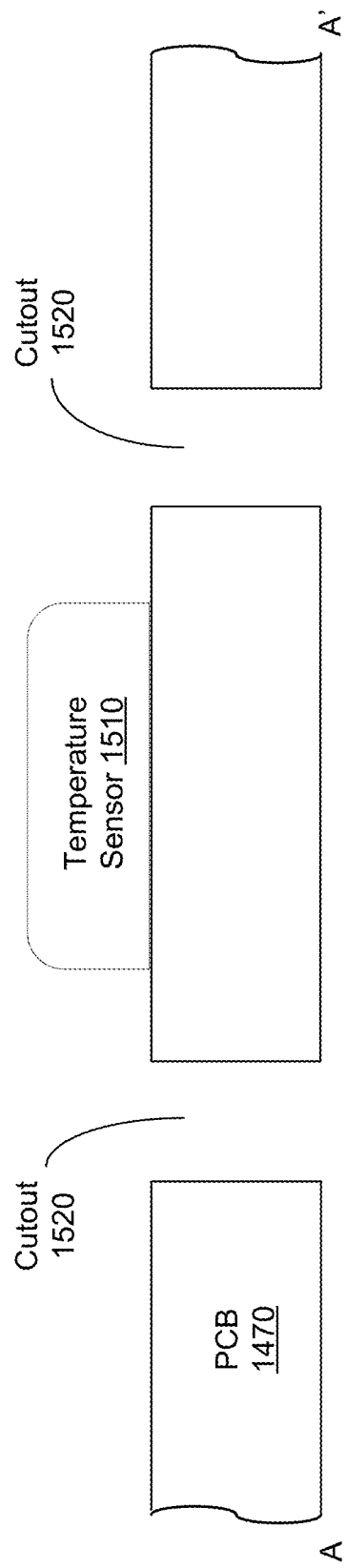
Figure 15C:
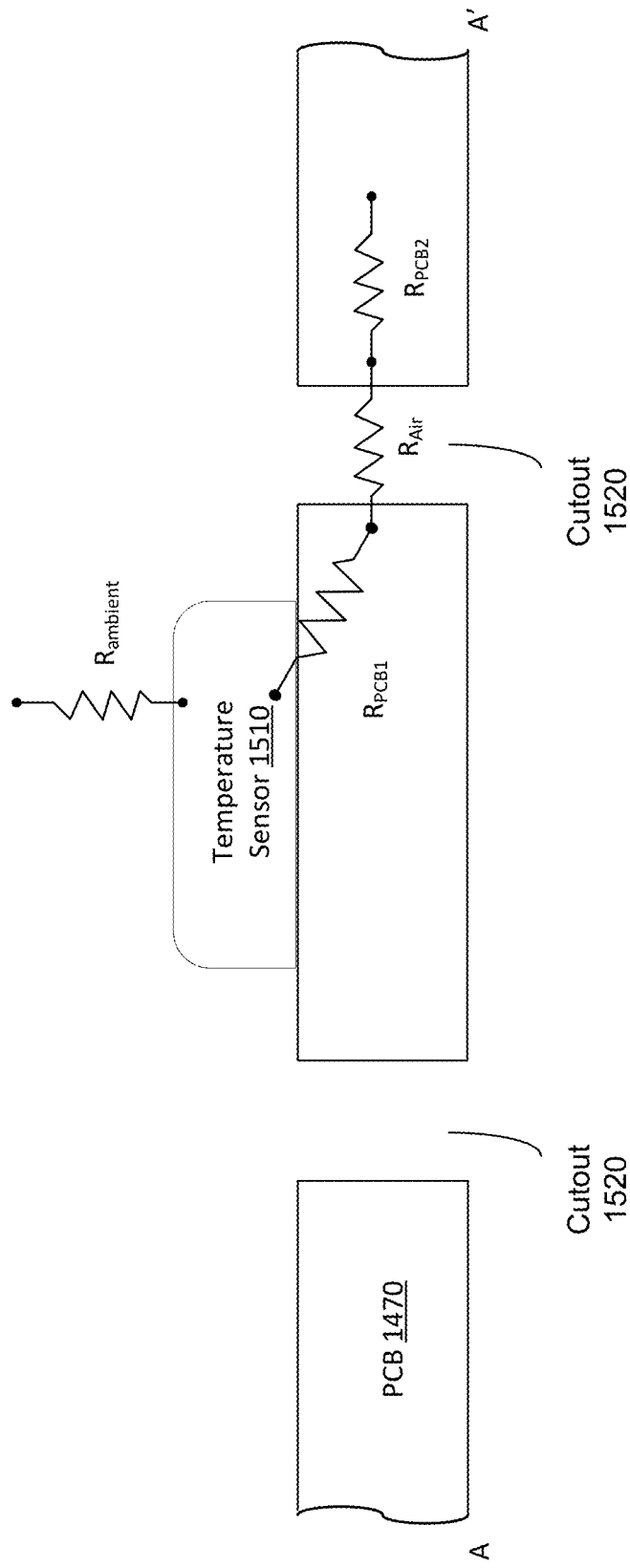
Figure 15D:
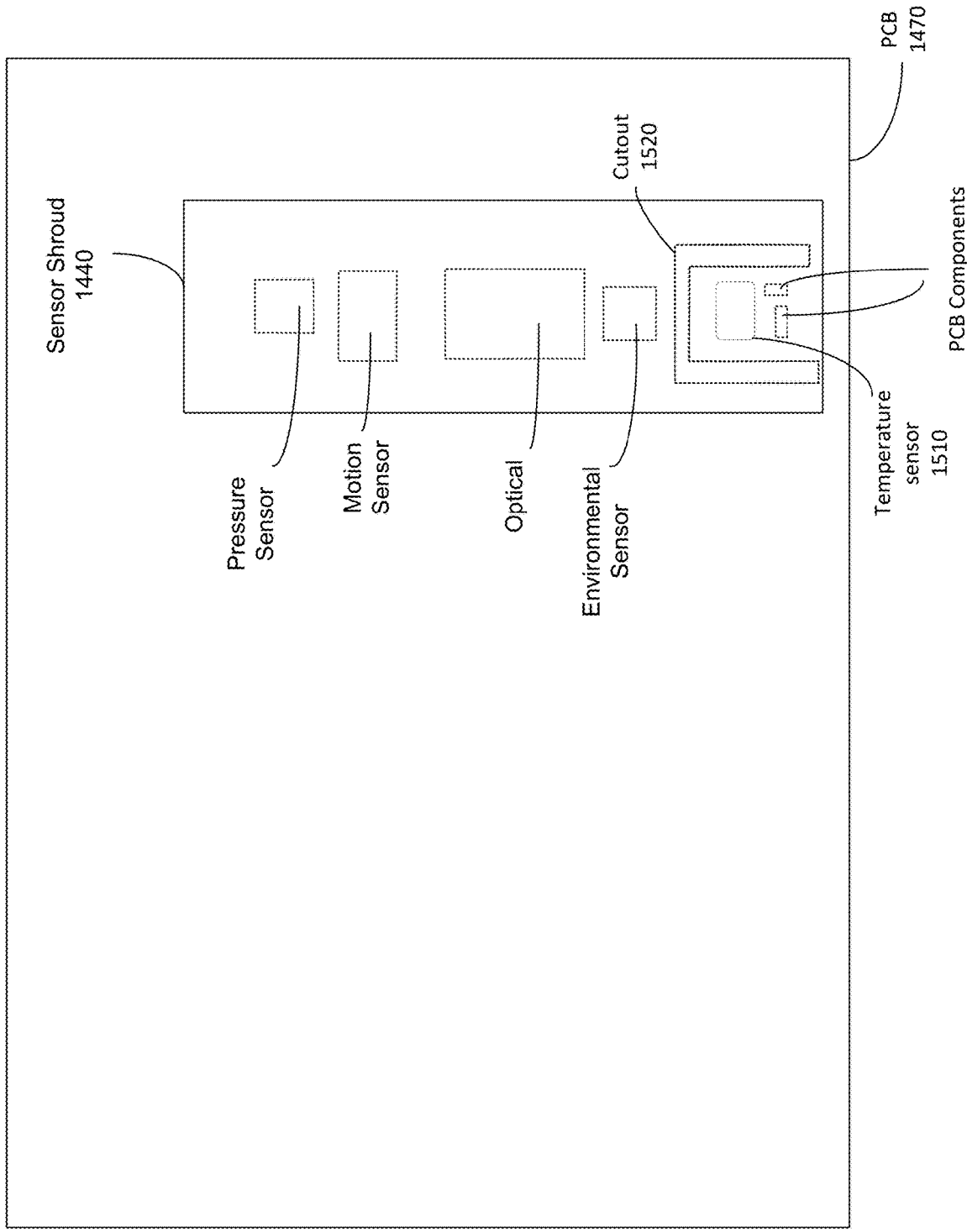

FIG. 15A is a schematic diagram showing a top down view of the PCB 1470. FIG. 15B is a schematic diagram showing a cross-section of the PCB 1470 along the line A-A'. The PCB 1470 includes a cutout 1520 for improving thermal isolation of a temperature sensor 1510 from other portions of the PCB 1470 and other device components on the PCB 1470. The cutout 1520 is a gap or opening in the PCB 1470 cut or stamped out of the PCB 1470, configured to reduce thermal conductivity between portions of the PCB 1470 and the temperature sensor 1510. The cutout 1520 partially surrounds the temperature sensor 1510, resulting in air gaps in the PCB 1470. Generally, the thermal resistance of air ($R_{air}$) will be higher than the thermal resistance ($R_{PCB1}$ and $R_{PCB2}$) of the materials used in the PCB 1470. As illustrated in the diagram of FIG. 15C, the thermal resistance of the air ($R_{air}$) in the cutout 1520 helps to create a higher effective thermal resistance for heat passing through the PCB 1470 to the temperature sensor from other electronic components on the PCB. This helps thermally isolate the temperature sensor from other portions of the PCB 1470 and allow a more accurate reading of ambient temperatures of the sensor tape node 1410.

FIG. 15C shows the positions of the onboard sensors and cutout 1520 relative to the shroud sensor shroud 1440 on the PCB 1470, according to some embodiments. In some embodiments, the PCB 1470 includes different or additional cutouts 1520 and temperature sensors 1510 than are shown in FIGS. 15A-15C. For example, the PCB 1470 may include a temperature sensor 1510 and corresponding cutout 1520 on the PCB that does not overlap with the flow channel 1430.

In some embodiments, a sensor tape node may include a cellular communication for transmitting data over a wireless cellular connection. The data may be transmitted to a server of the tracking system 400 over an internet connection, for example. The sensor tape node may include a plurality of wireless communication systems, the wireless communication systems including antennas, wireless communication interfaces, other components for wireless communication, or some combination thereof. For example, in an embodiment, a sensor tape node includes a Bluetooth communication system, a cellular communication system, and a LoRa communication system. In other examples, the sensor tape node includes a Bluetooth communication system and a cellular communication system.

Sensor data collected by the sensor tape node using onboard sensors and/or external sensor probes may be used for event detection and intervention. Sensor data may be transmitted to and aggregated by gateway nodes, other tape nodes, other wireless nodes of the tracking system 400, or some combination thereof for monitoring and analysis. In other embodiments, a sensor tape node itself is configured to analyze the data and detect events based off the sensor data it collects using onboard sensors and/or external sensor probes without relying on wireless communication with other wireless nodes of the tracking system 400. The sensor tape node may then take action in response to the detected event based off protocols or rules configured in the software or firmware of the sensor tape node.

Events detected based on sensor data may be stored on the memory of the sensor tape node and reported at a later time or may be immediately reported to a wireless node of the tracking system 400 that is wirelessly communicating with the sensor tape node, according to some embodiments.

The handling of sensor data, detection of events, communication between sensor tape nodes, other wireless nodes of the tracking system 400, and actions taken by the tracking system 400 are discussed in further detail in U.S. patent application Ser. No. 17/209,192, no U.S. Pat. No. 11,363,427 titled "WIRELESS SENSOR NODES FOR EQUIPMENT MONITORING," and U.S. patent application Ser. No. 17/493,823, titled "Distributed Intelligent Software for Vibration and Acoustic Monitoring and Systems and Methods Implementing the Same," both of which are herein incorporated by reference in their entirety.

Fall Detection

In some embodiments, a sensor tape node includes a 9-axis motion detection sensor. The 9-axis motion sensor may include a 3-axis gyroscope, a 3-axis accelerometer, and a 3-axis compass magnetometer. The sensor tape node may detect fall events based on detecting the following using an integrated 9-axis motion sensing system: acceleration over a threshold amount or a characteristic change in magnetic field corresponding to a fall event. The sensor tape node may respond to the detected fall event in accordance with the above description.

In some embodiments, the motion sensor of a tape node 1410 is positioned on the PCB 1470 at a position corresponding to a center of mass for the sensor tape node 1410. By being positioned at the center of mass, the sensor tape node may more accurately take sensor readings relating to motion and rotation of the sensor tape node 1410.

Computer Apparatus

Figure 16:
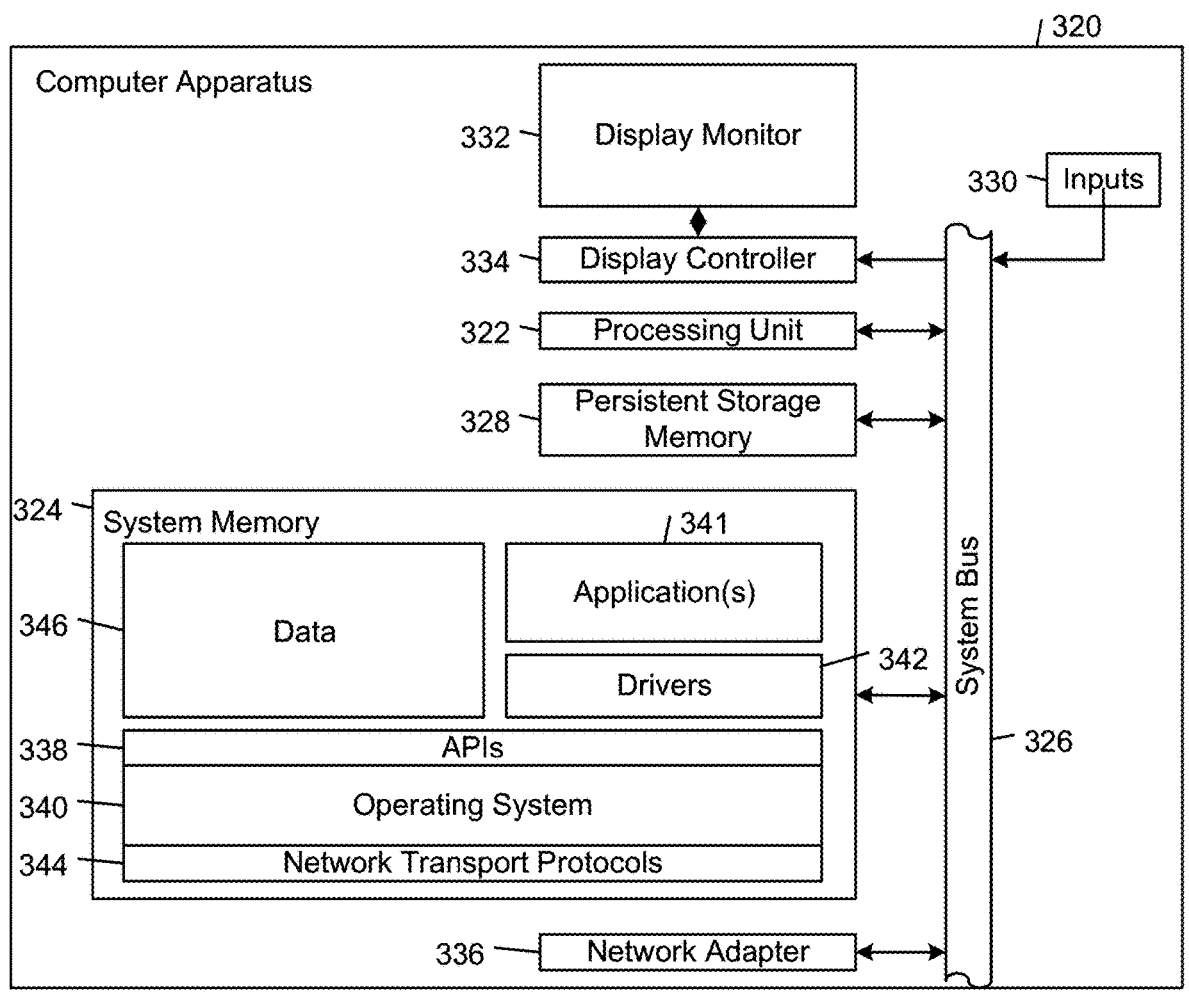
FIG. 16 shows an example embodiment of computer apparatus, according to some embodiments.

FIG. 16 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

ADDITIONAL EMBODIMENTS

A sensor-type adhesive tape platform includes a flexible substrate and a flexible cover layer. The flexible substrate and the flexible cover layer may collectively be referred to herein as an enclosure. A full capability adhesive tape platform is an embodiment of the adhesive tape platform that includes a cellular communication system, a GPS communication system, a Bluetooth communication system, one or more sensors, a battery, a circuit, a battery, a processor, and a memory or storage device. The battery, in some embodiments, is a rechargeable battery In some embodiments, the adhesive tape node is in the shape of a post card that is roughly 4 inches by 5 inches, with a thickness less than 0.25 inches.

The sensor-type adhesive tape platform includes one or more onboard sensors integrated in the adhesive tape platform. The sensors may include an optical sensor with a lens coupled to the optical sensor. An aperture in the enclosure may expose the lens. In some embodiments, the optical sensor does not include a lens.

The enclosure may include a flow channel for allowing air, chemical particles, moisture, or other particles to reach one or more sensors of the adhesive tape platform positioned in the flow channel.

Temperature sensing, humidity sensing, pressure sensing, and/or chemical sensing may be enabled by the flow channel and sensors.

The flow channel may include a membrane covering the opening of the flow channel. The membrane may be porous with pores that have a size that filters out particles of a size larger than a threshold size, while allowing specific particles into the flow channel for detection by the one or more sensors. In some embodiments the membrane includes an Expanded Polytetrafluoroethylene (EPTFE) material.

A membrane covering the opening of the flow channel may be configured with a customizable pore size, depending on the usage of the sensor tape node. In some embodiments, the membrane is configured to keep moisture out of the flow channel to keep water from damaging electronics or sensors in the adhesive tape platform.

Onboard sensors are connected to the PCB of the sensor tape node (e.g., soldered or otherwise connected to PCB traces, pads, through holes, or ports) and a protective sensor shroud covering the PCB and one or more of the sensors protects the one or more sensors and isolates the one or more sensor from other parts of the adhesive tape platform. In some embodiments, the sensor shroud has an shroud aperture for allowing particles or energy to pass into the sensor shroud and reach the one or more sensors. In some embodiments, a sensor shroud also includes a membrane, filter, or film that interfaces with or covers the shroud apertures. Membranes and filter may selectively allows particles or energy to pass through for detection by one or more sensors of the adhesive tape platform In some embodiments, the PCB includes cutouts around a temperature sensor. The cutout is a portion of the PCB that is removed or vacant. For example, the cutout may be made by cutting away, etching, or otherwise physically removing substrate material, metal material (e.g., copper from traces and ground plane) from portions of the PCB. The PCB cutout is a hole, cutout, notch in the PCB that thermally isolates the temperature sensor from other regions of PCB and the materials in the other regions.

Cutout results in much less thermal mass (no copper backplane or planar grounding in areas corresponding to the cutouts near where the temperature sensor is connected to the PCB). Cutouts minimize thermal contact of the portion of the PCB contacting the temperature sensor to thermally conductive portions of the PCB. Cutouts in PCB also reduces thermal mass coupling b/w the PCB and the temperature sensor.

The effective thermal resistance between the temperature sensor and other regions of the PCB is increased, relative to the thermal resistance between the temperature sensor and the ambient environment of the shroud or the adhesive tape platform, by adding cutouts to the PCB. This allows for better sensing the ambient environment, with less thermal interference from the PCB, due to heat being directed away from or to the temperature sensor by the PCB.

In some embodiments, an array of onboard sensors are integrated into the sensor-type adhesive tape platform. Each of the sensors are positioned on the PCB, based on the type of sensor. In some embodiments, a sensor array includes one or more a pressure sensor, a motion sensor, a light sensor, and a temperature sensor. In further embodiments, the sensor array additionally includes one or more humidity sensors. The sensor array may include an environmental sensor which includes at least one temperature sensor and at least one humidity sensor.

The motion sensor is positioned at a location that corresponds to a center of mass of the sensor-type adhesive tape platform, in some embodiments. The motion sensor may be positioned at a location that corresponds to a center of mass position along one axis or along two axes.

In other embodiments, the motion sensor is positioned at a location that corresponds to a first center-line of the adhesive tape platform. In further embodiments, the location of the motion sensor also corresponds to a second center line (e.g., correspond to a center point) of the adhesive tape platform.

The motion sensor may be positioned as close to the center line, center point, or center of mass of the adhesive platform as possible, without contradicting other design requirements of the adhesive tape platform and PCB, such as available space in the PCB layout design. The motion sensor being closer to the center of mass or center of line of the adhesive tape platform improves motion sensing accuracy.

The Pressure sensors, light sensors, environmental sensors, and Temperature sensors may be positioned further from a center line or center of mass of the adhesive tape platform than the motion sensor. In some embodiments, the Environmental sensors and humidity sensors are positioned closer to an edge of the adhesive tape platform than other sensors of the sensor array. Better ramp rates in humidity and saturation of data may result from positioning the humidity sensor at the edge of the adhesive tape platform compared to positioning it in the center of the adhesive tape platform. For sensor tape nodes with a flow channel, this positional arrangement of the sensors in the sensor array may result in more optimized air flow across the environmental sensors, according to some embodiments.

Air flow across the sensor shroud may be enabled by a flow channel in the enclosure of the adhesive tape platform with flow ports that allow air into and out of the flow channel. The enclosure has input and output flow ports port for air to flow into the flow channel and across the shroud. Shroud has separate compartments for each sensor, isolating each sensor from each other. The shroud may be weather proof to isolate one or more of the sensors from the weather elements. Shroud has separate apertures with filter/membrane/film to protect against or allow ingress for sensors that require passage of energy or particles to the respective sensor. Shroud provides strain relief and transfers strain that would normally go to sensor towards the enclosure/substrate, when the adhesive tape platform experiences force or bending. Shroud allows for a uniform, controlled height of the physical footprint of each sensor. This is especially useful for sensor-type adhesive tape platforms that have a flexible form factor. The sensor shroud 1440 allows the sensor tape node to maintains more uniform stress across the PCB and enclosure and substrate when the sensor tape node is bent or flexed.

In some embodiments, an adhesive tape platform includes an external sensor probe (See FIGS. 11-15B). The PCB of a sensor-type adhesive tape platform is connected to an off-board (also referred to as "external") sensor probe. The sensor includes a pigtail (also referred to herein as a "tether") that connects to a port on the PCB. The pigtail is a cable that is connected to the sensor on one end and can connect to the PCB on the other end. The pigtail is configured to attach and detach to the PCB repeatedly, in some embodiments.

The external sensor probe may be placed in an isolated or hostile environment while the adhesive tape platform with the other electronics components is placed outside of the isolated or hostile environment. For example, the isolated or hostile environment may be an icebox that includes low temperatures and moisture that may be detrimental to the adhesive tape platform. In some embodiments the external sensor probe is a thermocouple probe for sensing temperature.

The electronics on the PCB is limited to −55 to 125 C temperature tolerances, in some embodiments. In some examples the PCB and components on the PCB are rated for military grade performance. Onboard sensing can sense temperatures within −40 to 85 C, according to further embodiments.

The thermocouple probe is able to sense −250 C to 1000 C and is physically distant from the main PCB by up to the length of the pigtail. For example, the pigtail may be up to 10 meters long, according to some embodiments. The pigtail may be thermally resilient, able to withstand high or low temperatures (e.g., between −250 C and 1000 C).

Pigtail and the external sensor probe may be grounded through the ESD protected port on the PCB. A ground of the external sensor probe and the pigtail are connected to the same ground terminal, ground connection, or ground plane as a cellular antenna or another antenna of the adhesive tape platform, in some embodiments. The external sensor probe and the pigtail then forms a counterpoise for the cellular antenna that improves the efficiency of the cellular antenna, in some embodiments. This improvement may be a result of the pigtail and the external sensor probe increasing the ground length for the antennas on the tape.

In embodiments where the external sensor probe and pigtail is detachable from the adhesive tape platform, the external sensor probe and the pigtail may be detached from the adhesive tape platform, so that the adhesive tape platform may be returned or sent to a facility for refurbishment, collection, recycling, or safe disposal. In other embodiments, the external sensor probe is not returned to the facility with the adhesive tape platform. For example, the external sensor probe may be disposable.

In some embodiments, the adhesive tape platform with the external sensor probe tracks an asset for a period of time corresponding to a deployment. When the deployment ends, or when the asset arrives at a destination, where the asset no longer needs to be monitored, a user removes the adhesive tape platform and the external sensor probe from the asset. The user also detaches the pigtail and the external sensor probe, and sends only the adhesive tape platform, without the pigtail and the external sensor probe attached, to the facility.

ADDITIONAL CONFIGURATION INFORMATION

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A wireless sensor device comprising:
   a flexible substrate;
   a cover layer on the flexible substrate;
   a device layer between the flexible substrate and the cover layer comprising:
     a processor,
     a memory,
     a battery,
     a first wireless communication system, and one or more onboard sensors; and an external sensor probe electrically coupled to a circuit of the wireless sensor device by a flexible tether.

2. The wireless sensor device of claim 1, wherein the external sensor probe is a thermocouple probe.

3. The wireless sensor device of claim 2, wherein the external sensor probe is configured to withstand a different range of temperatures than the wireless sensor device.

4. The wireless sensor device of claim 2, wherein the one or more onboard sensors comprises an onboard temperature sensor.

5. The wireless sensor device of claim 4, wherein the wireless sensor device is configured to calculate a temperature differential between a temperature measured by the external sensor probe and a temperature measured by the onboard temperature sensor.

6. The wireless sensor device of claim 5, wherein the wireless sensor device is configured to detect an event based on the calculated temperature differential.

7. The wireless sensor device of claim 1, wherein the wireless sensor device is configured to be installed at separate location from the external sensor probe.

8. The wireless sensor device of claim 7, wherein the external sensor probe is positioned inside of a container and the wireless sensor device is positioned outside of a container.

9. The wireless sensor device of claim 1, wherein the external sensor probe is configured to be detachable from the wireless sensor device.

10. The wireless sensor device of claim 1, wherein the external sensor probe is configured to sense a different range of values from the one or more onboard sensors.

11. The wireless sensor device of claim 1, further comprising an adhesive on an external side of the flexible substrate, wherein the wireless sensor device is configured to be adhered to a surface of an object.

12. A system comprising:
a wireless sensor device comprising:
a processor,
a memory
a battery,
a first wireless communication system,
one or more onboard sensors, and
an external sensor probe electrically coupled to a circuit of the wireless sensor device by a flexible tether; and
a wireless node comprising a first wireless communication system and configured to wirelessly communicate with the wireless sensor device.

13. The system of claim 12, wherein the wireless node is configured to receive sensor data from the wireless sensor device, the sensor data comprising data collected using the external sensor probe.

14. The system of claim 12, wherein the wireless node comprises a server of a tracking system.

15. The system of claim 14, wherein the wireless sensor device communicates with the server using cellular-based or satellite-based communication.

16. The system of claim 12, wherein the wireless node comprises a gateway device configured to relay data received from the wireless sensor device to other wireless nodes of a tracking system.

17. The system of claim 12, wherein the external sensor probe is a thermocouple probe.

* * * * *